US012797923B2

(12) United States Patent
Martin et al.

(10) Patent No.: US 12,797,923 B2
(45) Date of Patent: Nov. 17, 2026

(54) DEVICES AND TECHNIQUES FOR LOW POWER WIRELESS NETWORKING FOR LANDFILL GAS EXTRACTION SYSTEMS

(71) Applicant: Loci Controls, Inc., Wareham, MA (US)

(72) Inventors: Ian Martin, Higganum, CT (US); James Paris, Downingtown, PA (US); Melinda Sims, Seattle, WA (US); Peter Quigley, Duxbury, MA (US)

(73) Assignee: Loci Controls, Inc., Wareham, MA (US)

( * ) Notice: Subject to any disclaimer, the term of this patent is extended or adjusted under 35 U.S.C. 154(b) by 0 days.

(21) Appl. No.: 18/905,575

(22) Filed: Oct. 3, 2024

(65) Prior Publication Data

US 2025/0114832 A1 Apr. 10, 2025

Related U.S. Application Data

(60) Provisional application No. 63/587,900, filed on Oct. 4, 2023.

(51) Int. Cl.
*B09B 5/00* (2006.01)
*H04W 4/38* (2018.01)

(52) U.S. Cl.
CPC ................. *B09B 5/00* (2013.01); *H04W 4/38* (2018.02)

(58) Field of Classification Search
CPC ................................... B09B 5/00; H04W 4/38
See application file for complete search history.

(56) References Cited

U.S. PATENT DOCUMENTS

| | | | |
|---|---|---|---|
| 3,062,037 | A | 11/1962 | Donner et al. |
| 3,567,387 | A | 3/1971 | Jones |
| 4,026,355 | A | 5/1977 | Johnson et al. |
| 4,191,541 | A | 3/1980 | Jenkins |

(Continued)

FOREIGN PATENT DOCUMENTS

| | | | |
|---|---|---|---|
| EP | 0 743 515 A1 | 11/1996 | |
| FR | 3126795 A1 * | 3/2023 | ............. G06F 30/18 |

(Continued)

OTHER PUBLICATIONS

U.S. Appl. No. 18/158,742, filed Jan. 24, 2023, Campanella et al.

(Continued)

*Primary Examiner* — Kyle Armstrong
(74) *Attorney, Agent, or Firm* — Wolf, Greenfield & Sacks, P.C.

(57) ABSTRACT

According to some aspects, there is provided systems and methods for monitoring extraction of landfill gas from a landfill having a plurality of wells by using a communication system configured to transmit information using a low-power wide area networking (LPWAN) protocol, the communication system comprising one or more gateway devices including a first gateway device and a plurality of communication node devices including a first communication node device. Further, there is provided methods for configuring a communication system comprising one or more gateway devices including a first gateway device and multiple communication node devices including a first communication node device.

19 Claims, 15 Drawing Sheets

(56) References Cited

U.S. PATENT DOCUMENTS 4,226,675 A 10/1980 Lewis et al.
4,227,897 A 10/1980 Reed
4,469,176 A 9/1984 Zison et al.
4,494,380 A 1/1985 Cross
4,499,378 A 2/1985 Miyatake et al.
4,670,148 A 6/1987 Schneider
4,890,672 A 1/1990 Hall
5,063,519 A 11/1991 Zison
5,209,941 A 5/1993 Wuest
5,223,229 A 6/1993 Brucker
5,239,861 A 8/1993 Fujita et al.
5,451,249 A 9/1995 Spiegel et al.
5,458,006 A 10/1995 Roqueta
5,665,314 A 9/1997 Berger et al.
5,681,360 A 10/1997 Siwajek et al.
5,695,641 A 12/1997 Cosulich et al.
5,830,262 A 11/1998 Marchini et al.
6,169,962 B1 1/2001 Brookshire et al.
6,196,324 B1 3/2001 Giacomino et al.
6,241,950 B1 6/2001 Veelenturf et al.
6,399,391 B1 6/2002 Tomlin
6,591,695 B1 7/2003 Brookshire et al.
6,595,287 B2 7/2003 Fisher
6,611,760 B2 8/2003 Bentley et al.
6,749,368 B2 6/2004 Ankeny et al.
6,799,477 B2 10/2004 Brookshire et al.
6,999,883 B1 2/2006 Brady et al.
7,187,299 B2 3/2007 Kunerth et al.
7,198,433 B2 4/2007 Augenstein et al.
7,243,730 B2 7/2007 Casey
7,273,098 B2 9/2007 Evans et al.
7,373,976 B2 5/2008 Casey
7,387,163 B2 6/2008 Seegers et al.
7,448,828 B2 11/2008 Augenstein et al.
7,748,450 B2 7/2010 Mundell
7,866,921 B2 1/2011 Stamoulis
7,950,464 B2 5/2011 Atencio et al.
7,972,082 B2 7/2011 Augenstein et al.
8,047,276 B2 11/2011 Stamoulis
8,168,121 B2 5/2012 Elkins
8,186,211 B2 5/2012 Boult et al.
8,840,708 B1 9/2014 Morrow et al.
8,924,029 B2 12/2014 Nath et al.
9,062,536 B2 6/2015 Fischer et al.
10,029,290 B2 7/2018 Campanella et al.
10,400,560 B2 9/2019 Campanella et al.
10,408,747 B2 9/2019 Schlueter et al.
10,449,578 B2 10/2019 Campanella et al.
10,556,259 B2 2/2020 Campanella et al.
10,576,514 B2 3/2020 Campanella et al.
10,576,515 B2 3/2020 Campanella et al.
10,639,687 B2 5/2020 Campanella et al.
10,682,678 B2 6/2020 Campanella et al.
10,705,063 B2 7/2020 Campanella et al.
10,882,086 B2 1/2021 Quigley et al.
10,931,304 B1 * 2/2021 Bartling .............. H03M 7/6047
10,946,420 B2 3/2021 Quigley et al.
11,007,555 B2 5/2021 Campanella et al.
11,067,549 B2 7/2021 Campanella et al.
11,072,006 B2 7/2021 Campanella et al.
11,084,074 B2 8/2021 Campanella et al.
11,235,361 B2 2/2022 Quigley et al.
11,273,473 B2 3/2022 Quigley et al.
11,484,919 B2 11/2022 Quigley et al.
11,491,521 B2 11/2022 Quigley et al.
11,602,777 B2 3/2023 Campanella et al.
11,602,778 B2 3/2023 Campanella et al.
11,623,256 B2 * 4/2023 Quigley .................. B09C 1/005
166/250.01
11,845,115 B2 12/2023 Campanella et al.
11,850,639 B2 12/2023 Campanella et al.
11,872,610 B2 1/2024 Quigley et al.
11,883,864 B2 1/2024 Quigley et al.
11,885,784 B2 1/2024 Campanella et al.
11,977,062 B2 5/2024 Campanella et al.
12,036,589 B2 7/2024 Campanella et al.
12,036,590 B2 7/2024 Campanella et al.
12,083,565 B2 9/2024 Quigley et al.
12,090,532 B2 9/2024 Campanella et al.
12,151,271 B2 11/2024 Campanella et al.
12,162,053 B2 12/2024 Quigley et al.
12,251,744 B2 3/2025 Quigley et al.
12,263,511 B2 4/2025 Campanella et al.
12,263,512 B2 4/2025 Campanella et al.
12,282,006 B2 4/2025 Campanella et al.
12,303,950 B2 5/2025 Campanella et al.
2001/0005812 A1 6/2001 Brookshire et al.
2002/0101718 A1 8/2002 Negishi
2003/0000281 A1 1/2003 Ketler et al.
2004/0055359 A1 3/2004 Ketler et al.
2004/0121201 A1 6/2004 Roche et al.
2006/0034664 A1 2/2006 Augenstein et al.
2006/0251540 A1 11/2006 Benning et al.
2007/0224085 A1 9/2007 Tooley
2007/0225923 A1 9/2007 Tooley
2007/0254196 A1 11/2007 Richards et al.
2008/0011248 A1 1/2008 Cutlip et al.
2008/0127726 A1 6/2008 Elkins
2009/0136298 A1 5/2009 Augenstein et al.
2010/0310733 A1 12/2010 Hoffman
2011/0061439 A1 3/2011 Dong et al.
2011/0061874 A1 3/2011 Stamoulis
2011/0081586 A1 4/2011 McAlister
2011/0132104 A1 6/2011 Benson et al.
2011/0198094 A1 8/2011 Stamoulis
2011/0231099 A1 9/2011 Elkins
2011/0272420 A1 11/2011 Landess et al.
2012/0191349 A1 7/2012 Lenz et al.
2012/0206715 A1 8/2012 Laub
2012/0287418 A1 11/2012 Scherer et al.
2013/0036811 A1 2/2013 Boult
2013/0180703 A1 7/2013 Colby
2013/0193325 A1 8/2013 Phillips et al.
2013/0247647 A1 9/2013 Mahoney et al.
2013/0334418 A1 12/2013 Cowie et al.
2014/0023576 A1 1/2014 Yezerets et al.
2014/0182846 A1 7/2014 Fischer et al.
2014/0284935 A1 9/2014 Disbennett et al.
2014/0338878 A1 11/2014 Tessnow
2015/0000426 A1 1/2015 Rolston et al.
2015/0168274 A1 6/2015 Sheffield
2015/0226045 A1 8/2015 Fischer et al.
2015/0275632 A1 10/2015 Fischer et al.
2015/0330938 A1 11/2015 Henson et al.
2015/0354032 A1 12/2015 Yuan et al.
2015/0362468 A1 12/2015 Gerhold
2016/0011159 A1 1/2016 Sekiya et al.
2016/0025696 A1 1/2016 Birks et al.
2016/0033391 A1 2/2016 Stroganov et al.
2016/0123946 A1 5/2016 Dufresne
2016/0169826 A1 6/2016 Youssi et al.
2016/0209133 A1 7/2016 Hu et al.
2016/0237007 A1 8/2016 Morrow et al.
2016/0238494 A1 8/2016 Chrin, II
2016/0247183 A1 8/2016 Foody
2016/0287870 A1 10/2016 Yip et al.
2016/0377457 A1 12/2016 Zhang et al.
2017/0080762 A1 3/2017 Guinart et al.
2017/0122065 A1 5/2017 Fischer et al.
2017/0173505 A1 6/2017 Dhingra et al.
2017/0176590 A1 6/2017 Sharonov et al.
2017/0216891 A1 8/2017 Campanella et al.
2017/0216892 A1 8/2017 Campanella et al.
2017/0216893 A1 8/2017 Campanella et al.
2017/0218730 A1 8/2017 Campanella et al.
2017/0218731 A1 8/2017 Campanella et al.
2017/0218732 A1 8/2017 Campanella et al.
2017/0254196 A1 9/2017 Campanella et al.
2017/0254787 A1 9/2017 Campanella et al.
2017/0328750 A1 11/2017 Jehle et al.
2018/0003572 A1 1/2018 Garsd et al.
2018/0003684 A1 1/2018 Kerr
2018/0024202 A1 1/2018 Erickson et al.
2018/0154408 A1 6/2018 Ko et al.

(56) References Cited

U.S. PATENT DOCUMENTS

| | | | |
|---|---|---|---|
| 2018/0164137 | A1 | 6/2018 | Layher et al. |
| 2018/0171604 | A1 | 6/2018 | Kim et al. |
| 2018/0209248 | A1 | 7/2018 | Patel et al. |
| 2018/0304323 | A1 | 10/2018 | Campanella et al. |
| 2019/0069245 | A1 | 2/2019 | Miller et al. |
| 2019/0232346 | A1 | 8/2019 | Speer et al. |
| 2019/0277119 | A1 | 9/2019 | Campion |
| 2019/0277821 | A1 | 9/2019 | Quigley et al. |
| 2020/0086365 | A1 | 3/2020 | Campanella et al. |
| 2020/0101504 | A1 | 4/2020 | Quigley et al. |
| 2020/0101505 | A1 | 4/2020 | Quigley et al. |
| 2020/0130033 | A1 | 4/2020 | Campanella et al. |
| 2020/0197990 | A1 | 6/2020 | Quigley et al. |
| 2020/0254497 | A1 | 8/2020 | Campanella et al. |
| 2020/0306806 | A1 | 10/2020 | Quigley et al. |
| 2020/0306807 | A1 | 10/2020 | Quigley et al. |
| 2021/0046524 | A1 | 2/2021 | Quigley et al. |
| 2021/0178436 | A1 | 6/2021 | Quigley et al. |
| 2021/0229142 | A1 | 7/2021 | Quigley et al. |
| 2021/0372977 | A1 | 12/2021 | Campanella et al. |
| 2022/0008970 | A1 | 1/2022 | Quigley et al. |
| 2022/0008971 | A1 | 1/2022 | Quigley et al. |
| 2022/0008972 | A1 | 1/2022 | Quigley et al. |
| 2022/0008973 | A1 | 1/2022 | Quigley et al. |
| 2022/0062959 | A1 | 3/2022 | Campanella et al. |
| 2022/0062960 | A1 | 3/2022 | Campanella et al. |
| 2023/0114970 | A1 | 4/2023 | Quigley et al. |
| 2023/0234112 | A1 | 7/2023 | Campanella et al. |
| 2023/0271234 | A1 | 8/2023 | Campanella et al. |
| 2023/0302508 | A1 | 9/2023 | Campanella et al. |
| 2023/0302509 | A1 | 9/2023 | Campanella et al. |
| 2023/0324353 | A1 | 10/2023 | Campanella et al. |
| 2024/0017311 | A1 | 1/2024 | Campanella et al. |
| 2024/0066572 | A1 | 2/2024 | Campanella et al. |
| 2024/0066573 | A1 | 2/2024 | Campanella et al. |
| 2024/0100578 | A1 | 3/2024 | Campanella et al. |
| 2024/0109110 | A1 | 4/2024 | Quigley et al. |
| 2024/0109111 | A1 | 4/2024 | Campanella et al. |
| 2024/0167990 | A1 | 5/2024 | Campanella et al. |
| 2024/0316605 | A1 | 9/2024 | Campanella et al. |
| 2024/0316606 | A1 | 9/2024 | Campanella et al. |
| 2024/0390958 | A1 | 11/2024 | Quigley et al. |
| 2024/0390961 | A1 | 11/2024 | Campanella et al. |
| 2025/0033099 | A1 | 1/2025 | Campanella et al. |
| 2025/0050395 | A1 | 2/2025 | Quigley et al. |
| 2025/0214125 | A1 | 7/2025 | Quigley et al. |
| 2025/0262652 | A1 | 8/2025 | Campanella et al. |
| 2025/0264446 | A1 | 8/2025 | Campanella et al. |

FOREIGN PATENT DOCUMENTS

| | | | |
|---|---|---|---|
| KR | 200495182 | Y1 | 3/2022 |
| WO | WO 2006/005014 | A2 | 1/2006 |
| WO | WO 2015/072989 | A1 | 5/2015 |
| WO | WO 2016/010985 | A1 | 1/2016 |
| WO | WO 2018/194650 | A1 | 10/2018 |
| WO | WO 2020/072457 | A1 | 4/2020 |

OTHER PUBLICATIONS

U.S. Appl. No. 18/733,043, filed Jun. 4, 2024, Campanella et al.

PCT/US2017/020196, Jun. 7, 2017, International Search Report and Written Opinion.

PCT/US17/28818, Jul. 10, 2017, Invitation to Pay Additional Fees.

PCT/US17/28818, Sep. 8, 2017, International Search Report and Written Opinion.

PCT/US2019/020251, May 31, 2019, International Search Report and Written Opinion.

EP 17760717.3, Oct. 2, 2019, Extended European Search Report.

PCT/US2019/054013, Dec. 4, 2019, International Search Report and Written Opinion.

EP 17906368.0,Oct. 15, 2020, Extended European Search Report.

PCT/US2021/013850, Jun. 21, 2021, International Search Report and Written Opinion.

PCT/US2021/040653, Nov. 26, 2021, International Search Report and Written Opinion.

EP 17760717.3, Feb. 21, 2022, Communication pursuant to Article 94(3) EPC.

EP 19869105.7, May 23, 2022, Extended European Search Report.

EP 17906368.0, Aug. 4, 2022, Communication pursuant to Article 94(3) EPC.

PCT/US2019/054013, Apr. 15, 2021, International Preliminary Report on Patentability.

PCT/US2021/013850, Aug. 11, 2022, International Preliminary Report on Patentability.

PCT/US2021/040653, Jan. 26, 2023, International Preliminary Report on Patentability.

EP 17906368.0, May 11, 2023, Communication pursuant to Article 94(3) EPC.

Campanella et al., Designs for Enhanced Reliability and Calibration of Landfill Gas Measurement and Control Devices. Co-pending U.S. Appl. No. 15/464,236, filed Mar. 20, 2017.

Campanella et al., Designs for Enhanced Reliability and Calibration of Landfill Gas Measurement and Control Devices. Co-pending U.S. Appl. No. 15/478,583, filed Apr. 4, 2017.

Campanella et al., Designs for Enhanced Reliability and Calibration of Landfill Gas Measurement and Control Devices. Co-pending U.S. Appl. No. 17/343,317, filed Jun. 9, 2021.

Campanella et al., Designs for Enhanced Reliability and Calibration of Landfill Gas Measurement and Control Devices. Co-pending U.S. Appl. No. 18/327,580, filed Jun. 1, 2023.

Campanella et al., Designs for Enhanced Reliability and Calibration of Landfill Gas Measurement and Control Devices. Co-pending U.S. Appl. No. 18/425,421, filed Jan. 29, 2024.

Campanella et al., Devices and Techniques Relating to Landfill Gas Extraction. Co-pending U.S. Appl. No. 14/532,807, filed Nov. 4, 2014.

Campanella et al., Devices and Techniques Relating to Landfill Gas Extraction. Co-pending U.S. Appl. No. 15/456,936, filed Mar. 13, 2017.

Campanella et al., Devices and Techniques Relating to Landfill Gas Extraction. Co-pending U.S. Appl. No. 15/456,982, filed Mar. 13, 2017.

Campanella et al., Devices and Techniques Relating to Landfill Gas Extraction. Co-pending U.S. Appl. No. 15/493,174, filed Apr. 21, 2017.

Campanella et al., Devices and Techniques Relating to Landfill Gas Extraction. Co-pending U.S. Appl. No. 15/493,184, filed Apr. 21, 2017.

Campanella et al., Devices and Techniques Relating to Landfill Gas Extraction. Co-pending U.S. Appl. No. 15/493,201, filed Apr. 21, 2017.

Campanella et al., Devices and Techniques Relating to Landfill Gas Extraction. Co-pending U.S. Appl. No. 16/024,085, filed Jun. 29, 2018.

Campanella et al., Devices and Techniques Relating to Landfill Gas Extraction. Co-pending U.S. Appl. No. 16/694,745, filed Nov. 25, 2019.

Campanella et al., Devices and Techniques Relating to Landfill Gas Extraction. Co-pending U.S. Appl. No. 16/726,232, filed Dec. 23, 2019.

Campanella et al., Devices and Techniques Relating to Landfill Gas Extraction. Co-pending U.S. Appl. No. 16/745,892, filed Jan. 17, 2020.

Campanella et al., Devices and Techniques Relating to Landfill Gas Extraction. Co-pending U.S. Appl. No. 16/831,131, filed Mar. 26, 2020.

Campanella et al., Devices and Techniques Relating to Landfill Gas Extraction. Co-pending U.S. Appl. No. 17/369,318, filed Jul. 7, 2021.

Campanella et al., Devices and Techniques Relating to Landfill Gas Extraction. Co-pending U.S. Appl. No. 17/369,395, filed Jul. 7, 2021.

(56) References Cited

OTHER PUBLICATIONS

Campanella et al., Devices and Techniques Relating to Landfill Gas Extraction. Co-pending U.S. Appl. No. 18/158,742, filed Jan. 24, 2023.
Campanella et al., Devices and Techniques Relating to Landfill Gas Extraction. Co-pending U.S. Appl. No. 18/168,983, filed Feb. 14, 2023.
Campanella et al., Devices and Techniques Relating to Landfill Gas Extraction. Co-pending U.S. Appl. No. 18/327,516, filed Jun. 1, 2023.
Campanella et al., Devices and Techniques Relating to Landfill Gas Extraction. Co-pending U.S. Appl. No. 18/327,638, filed Jun. 1, 2023.
Campanella et al., Devices and Techniques Relating to Landfill Gas Extraction. Co-pending U.S. Appl. No. 18/327,694, filed Jun. 1, 2023.
Campanella et al., Devices and Techniques Relating to Landfill Gas Extraction. Co-pending U.S. Appl. No. 18/498,770, filed Oct. 31, 2023.
Campanella et al., Devices and Techniques Relating to Landfill Gas Extraction. Co-pending U.S. Appl. No. 18/498,869, filed Oct. 31, 2023.
Quigley et al., Automated Compliance Measurement and Control for Landfill Gas Extraction Systems. Co-pending U.S. Appl. No. 17/152,252, filed Jan. 19, 2021.
Quigley et al., Automated Compliance Measurement and Control for Landfill Gas Extraction Systems. Co-pending U.S. Appl. No. 18/540,281, filed Dec. 14, 2023.
Quigley et al., Devices and Techniques Relating to Landfill Gas Extraction. Co-pending U.S. Appl. No. 16/927,471, filed Jul. 13, 2020.
Quigley et al., Devices and Techniques Relating to Landfill Gas Extraction. Co-pending U.S. Appl. No. 16/927,479, filed Jul. 13, 2020.
Quigley et al., Devices and Techniques Relating to Landfill Gas Extraction. Co-pending U.S. Appl. No. 16/927,482, filed Jul. 13, 2020.
Quigley et al., Devices and Techniques Relating to Landfill Gas Extraction. Co-pending U.S. Appl. No. 16/927,488, filed Jul. 13, 2020.
Quigley et al., Devices and Techniques Relating to Landfill Gas Extraction. Co-pending U.S. Appl. No. 18/132,753, filed Apr. 10, 2023.
Quigley et al., Landfill Gas Extraction Control System. Co-pending U.S. Appl. No. 16/290,387, filed Mar. 1, 2019.
Quigley et al., Landfill Gas Extraction Control System. Co-pending U.S. Appl. No. 17/167,539, filed Feb. 4, 2021.
Quigley et al., Landfill Gas Extraction Control System. Co-pending U.S. Appl. No. 18/526,824, filed Dec. 1, 2023.
Quigley et al., Landfill Gas Extraction Systems and Methods. Co-pending U.S. Appl. No. 16/589,372, filed Oct. 1, 2019.
Quigley et al., Landfill Gas Extraction Systems and Methods. Co-pending U.S. Appl. No. 16/589,391, filed Oct. 1, 2019.
Quigley et al., Landfill Gas Extraction Systems and Methods. Co-pending U.S. Appl. No. 16/901,405, filed Jun. 15, 2020.
Quigley et al., Landfill Gas Extraction Systems and Methods. Co-pending U.S. Appl. No. 16/901,430, filed Jun. 15, 2020.
Quigley et al., Landfill Gas Extraction Systems and Methods. Co-pending U.S. Appl. No. 17/086,987, filed Nov. 2, 2020.
Quigley et al., Landfill Gas Extraction Systems and Methods. Co-pending U.S. Appl. No. 17/959,446, filed Oct. 4, 2022.
Campanella et al., Devices and Techniques Relating to Landfill Gas Extraction. Co-pending U.S. Appl. No. 18/733,111, filed Jun. 4, 2024.
International Search Report and Written Opinion for International Application No. PCT/US2017/020196 mailed Jun. 7, 2017.
Invitation to Pay Additional Fees for International Application No. PCT/US17/28818 mailed Jul. 10, 2017.
International Search Report and Written Opinion for International Application No. PCT/US17/28818 mailed Sep. 8, 2017.
International Search Report and Written Opinion for International Application No. PCT/US2019/020251 mailed May 31, 2019.
Extended European Search Report for European Application No. 17760717.3 dated Oct. 2, 2019.
International Search Report and Written Opinion for International Application No. PCT/US2019/054013 mailed Dec. 4, 2019.
Extended European Search Report for European Application No. 17906368.0 dated Oct. 15, 2020.
International Preliminary Report on Patentability for International Application No. PCT/US2019/054013 mailed Apr. 15, 2021.
International Search Report and Written Opinion for International Application No. PCT/US2021/013850 mailed Jun. 21, 2021.
International Search Report and Written Opinion for International Application No. PCT/US2021/040653 mailed Nov. 26, 2021.
Communication pursuant to Article 94(3) EPC for European Application No. 17760717.3 dated Feb. 21, 2022.
Extended European Search Report for European Application No. 19869105.7 dated May 23, 2022.
Communication pursuant to Article 94(3) EPC for European Application No. 17906368.0 dated Aug. 4, 2022.
International Preliminary Report on Patentability for International Application No. PCT/US2021/013850 mailed Aug. 11, 2022.
International Preliminary Report on Patentability for International Application No. PCT/US2021/040653 mailed Jan. 26, 2023.
Communication pursuant to Article 94(3) EPC for European Application No. 17906368.0 dated May 11, 2023.
[No Author Listed], 50% CH4, 35% CO2, 15% N2. Instrument Depot. 2015. http://www.instrumentdepot.com/50-methane-35-carbon-dioxide-15-nitrogen-c-1_27_472.html.
[No Author Listed], Cloud-Based Wellwatcher Analytics Platform Offers 24/7/365 Visibility on Landfill Gas-Collection Systems. Tech Note. Loci Controls. Nov. 2016. 1 page.
[No Author Listed], Increase Landfill Gas Collection By Up Tto 30%. Tech Note. Loci Controls. Oct. 2016. 1 page.
[No Author Listed], Loci Controller Combines Active Flow Control With 24/7/365 Real-Time Gas-Composition Analysis to Maximize Landfill Gas Extraction. Tech Note. Loci Controls. Nov. 2016. 1 page.
[No Author Listed], Loci Sentry Utilizes Passive Flow and Gas-Composition Monitoring in Conjunction With Loci Controller and Wellwatcher Analytics to Maximize Landfill Gas Collection. Tech Note. Loci Controls. Nov. 2016. 1 page.
[No Author Listed], Methacontrol® Optimizing landfill gas recovery. Oct. 9, 2013. http://www.veolia.com/en/veolia-group/media/news/methacontrol-r. 1 page.
Bieker et al., Real-Time Production Optimization of Offshore Oil and Gas Production Systems: A Technology Survey. SPE International. 2006. 8 pages.
Collins et al., Web-based monitoring of year-length deployments of autonomous gas sensing platforms on landfill sites. 2011 IEEE Sensors Proceedings. 2011:1620-3.
Fay et al., Remote Real-Time Monitoring of Subsurface Landfill Gas Migration. Sensors. 2011;11(7):6603-29.
Xu et al., Impact of changes in barometric pressure on landfill methane emission. AGU Publications. Jul. 10, 2014. 17 pages.
PCT/US2024/049708, Jan. 17, 2025, International Search Report and Written Opinion.
International Search Report and Written Opinion mailed Jan. 17, 2025 in connection with International Application No. PCT/US2024/049708.
Paran et al., Internet of Things (IoT) Based for Landfill Gas Monitoring System. Evolution in Electrical and Electronic Engineering. Jun. 15, 2022;3(1):394-401.
Quigley et al., Landfill Gas Extraction Control System. Co-pending U.S. Appl. No. 19/051,961, filed Feb. 12, 2025.

* cited by examiner

DEVICES AND TECHNIQUES FOR LOW POWER WIRELESS NETWORKING FOR LANDFILL GAS EXTRACTION SYSTEMS

CROSS-REFERENCE TO RELATED APPLICATIONS

This application claims the benefit of priority under § 119 (e) to U.S. Provisional Application Ser. No. 63/587,900 titled "DEVICES AND TECHNIQUES FOR LOW POWER WIRELESS NETWORKING FOR LANDFILL GAS EXTRACTION SYSTEMS" and filed on Oct. 4, 2023, which is incorporated by reference herein in its entirety.

BACKGROUND

Landfills produce gas as a result of decomposition of organic waste in the landfill. The decomposition process may result in release of methane and other gases. Landfill sites are often capped with a layer of cover material to reduce the escape of gases from the landfill to the atmosphere. Landfills may further install gas extraction systems to pull landfill gas out before it can permeate through the cover layer and escape. The gas extraction systems may comprise multiple wells drilled into the landfill, and landfill gas may be extracted from the landfill via the wells into a gas collection system. The extracted landfill gas may be used to generate electricity, put in a pipeline for distribution, or disposed of.

SUMMARY

According to some aspects, there is provided a method for monitoring extraction of landfill gas from a landfill having a plurality of wells by using a communication system configured to transmit information using a low-power wide area networking (LPWAN) protocol, the communication system comprising one or more gateway devices including a first gateway device and a plurality of communication node devices including a first communication node device, the method comprising: obtaining, at the first communication node device and from a first control system configured to monitor and/or control extraction of landfill gas at a first well of the plurality of wells, information comprising a set of one or more measurements of one or more landfill gas characteristics of landfill gas being extracted from the first well and/or other data; encoding the set of one or more measurements of the one or more landfill gas characteristics and/or other data in a first set of one or more packets in accordance with the LPWAN protocol; transmitting the first set of one or more packets from the first communication node device to the first gateway device using the LPWAN protocol; transmitting the first set of one or more packets from the first gateway device to at least one server; decoding, using the at least one server, the first set of one or more packets to obtain the set of one or more measurements of the one or more landfill gas characteristics; and determining, using the at least one server and the set of one or more measurements of the one or more landfill gas characteristics and/or other data, whether to perform an action.

According to some aspects, there is provided a communication system configured to transmit information using a low-power wide area networking (LPWAN) protocol, the communication system comprising: a plurality of communication node devices including a first communication node device; one or more gateway devices including a first gateway device; and at least one server, wherein: the first communication node device is configured to: obtain from a first control system configured to monitor and/or control extraction of landfill gas at a first well of a plurality of wells in a landfill, information comprising a set of one or more measurements of one or more landfill gas characteristics of landfill gas being extracted from the first well and/or other data; encode the set of one or more measurements of the one or more landfill gas characteristics and/or other data in a first set of one or more packets in accordance with the LPWAN protocol; transmit the first set of one or more packets from the first communication node device to the first gateway device using the LPWAN protocol; and the first gateway device is configured to: transmit the first set of one or more packets from the first gateway device to the at least one server; and the at least one server is configured to: decode, using the at least one server, the first set of one or more packets to obtain the set of one or more measurements of the one or more landfill gas characteristics; determine, using the at least one server and the set of one or more measurements of the one or more landfill gas characteristics and/or other data, whether to perform an action.

According to some aspects, there is provided a method for monitoring extraction of landfill gas from a landfill having a plurality of wells by using a communication system configured to transmit information using a low-power wide area networking (LPWAN) protocol, the communication system comprising one or more gateway devices including a first gateway device and a plurality of communication node devices including a first communication node device, the method comprising: obtaining, at the first communication node device and from a first control system configured to monitor and/or control extraction of landfill gas at a first well of the plurality of wells, information comprising a set of one or more measurements of one or more landfill gas characteristics of landfill gas being extracted from the first well and/or other data; encoding the set of one or more measurements of the one or more landfill gas characteristics and/or other data in a first set of one or more packets in accordance with the LPWAN protocol; transmitting the first set of one or more packets from the first communication node device to the first gateway device using the LPWAN protocol; transmitting the first set of one or more packets from the first gateway device to at least one server; receiving, with the first gateway device, a second set of one or more packets from the at least one server, the second set of packets being encoded from a command from the at least one server to adjust, with the first control system, a flow rate of landfill gas being extracted from the first well; transmitting the second set of one or more packets from the first gateway device to the first communication node; decoding, using the first communication node, the second set of one or more packets to obtain the command to adjust the flow rate of landfill gas being extracted from the first well; and adjusting a position of a valve of the first well based on the command.

According to some aspects, there is provided a communication system configured to transmit information using a low-power wide area networking (LPWAN) protocol, the communication system comprising: a plurality of communication node devices including a first communication node device; and one or more gateway devices including a first gateway device; wherein: the first communication node device is configured to: obtain from a first control system configured to monitor and/or control extraction of landfill gas at a first well of a plurality of wells in a landfill, information comprising a set of one or more measurements of one or more landfill gas characteristics of landfill gas being extracted from the first well and/or other data; encode the set of one or more measurements of the one or more landfill gas characteristics in a first set of one or more packets in accordance with the LPWAN protocol; transmit the first set of one or more packets from the first communication node device to the first gateway device using the LPWAN protocol; the first gateway device is configured to: transmit the first set of one or more packets from the first gateway device to at least one server; receive a second set of one or more packets from the at least one server, the second set of packets being encoded from a command from the at least one server to adjust, with the first control system, a flow rate of landfill gas being extracted from the first well; and transmit the second set of one or more packets from the first gateway device to the first communication node; and the first communication node device is further configured to: decode, using the first communication node, the second set of one or more packets to obtain the command to adjust the flow rate of landfill gas being extracted from the first well; and provide the command to the first control system, wherein the first control system is configured to adjust a position of a valve of the first well based on the command.

According to some aspects, there is provided a method for configuring a communication system comprising one or more gateway devices including a first gateway device and multiple communication node devices including a first communication node device, the method comprising: (A) identifying an initial landfill location in a region of a landfill at which to position a first gateway device; (B) positioning the first gateway device at the initial landfill location; (C) obtaining information identifying the multiple communication node devices; (D) configuring, using the information identifying the multiple communication node devices, the first gateway device to communicate with the multiple communication node devices using a low power wide area networking (LPWAN) protocol; (E) evaluating quality of LPWAN communications between the first gateway device and the multiple communication node devices by transmitting test signals between the first gateway device and individual ones of the multiple communication node devices; (F) determining, based on results of the evaluating, whether to continue operating the first gateway device at the initial landfill location; (G) when it is determined to continue operating the first gateway device at the initial landfill location, operating the first gateway device at the initial landfill location; and (H) when it is determined not to continue operating the first gateway device at the initial location, identifying one or more other landfill locations at which to position the first gateway device and performing steps (E)-(F) until it is determined that a particular one of the one or more other landfill locations provides sufficient quality LPWAN communications between the first gateway device and the multiple communication node devices.

BRIEF DESCRIPTION OF THE DRAWINGS

Various aspects and embodiments will be described with reference to the following figures. It should be appreciated that the figures are not necessarily drawn to scale. For purposes of clarity, not every component may be labeled in every drawing. In the drawings.

DETAILED DESCRIPTION

Figure 1:
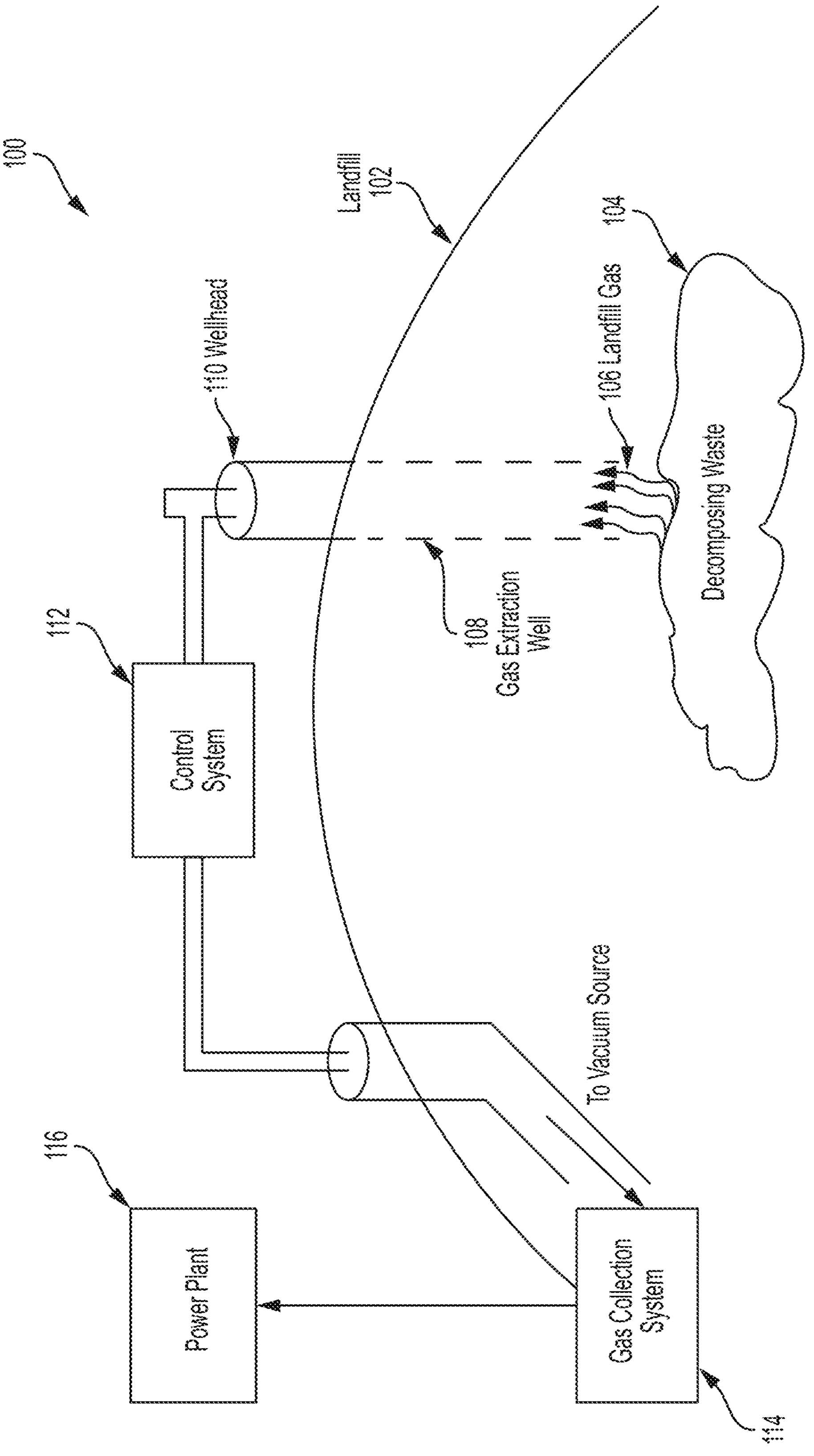
FIG. 1 shows an illustrative environment in which aspects of the technology described herein may be implemented.

Decomposition processes of landfill waste typically produce landfill gas as a by-product. The landfill gas produced comprises a mixture of gasses, including methane, carbon dioxide, oxygen, and nitrogen, for example. Systems have been developed for extracting the generated landfill gas from the landfill. For example, if left unchecked, landfill gas accumulated under the landfill surface may rise, penetrating a cover layer at a surface of the landfill, and being emitted into the atmosphere, resulting in bad odors and pollution to the environment. Accordingly, it is desirable to extract generated landfill gas before it accumulates via a gas extraction system. The extracted landfill gas may also be used as a source of energy.

Gas extraction systems typically include one or more sensors for measuring one or more characteristics related to the gas extraction process. Such characteristics may be of interest to the landfill operator, customer purchasing the extracted gas, and/or other interested parties. In addition, local, state, and federal regulations may require monitoring of certain characteristics of extracted landfill gas, such as gas composition. In some cases, values of the monitored characteristics may be used to determine whether to adjust how the gas extraction system is operating. Accordingly, the ability to frequently communicate measurements of one or more characteristics of extracted landfill gas is important.

The flow rate at which landfill gas is extracted from a landfill impacts the composition of the extracted landfill gas, and therefore the quality. In addition, gas extraction flow rate may impact conditions in and around the landfill, such as greenhouse gas emissions and safety conditions at the landfill. For example, higher flow rates may pull too much oxygen from the atmosphere into the landfill, which may result in energy content of the extracted gas being lower than a desired energy content due to destruction of some or all of the bacteria that convert decomposing waste into methane and/or may result in underground fires deep within the landfill that are difficult to extinguish. Lower flow rates may not extract enough landfill gas, allowing the landfill gas to accumulate and escape the surface of the landfill. Therefore, in order to obtain the desired gas composition and prevent unwanted conditions from occurring, the flow rate at which the generated landfill gas is extracted from the landfill may be carefully controlled. Determining whether and/or how to adjust gas extraction flow rates may be based on one or more characteristics of the extracted landfill gas itself. Therefore, the ability to communicate up-to-date information regarding one or more characteristics of landfill gas is important in order to perform gas extraction control.

The landfill may include control systems coupled to gas extraction piping for performing the monitoring and/or control described herein. For example, a control system may be disposed at each well through which landfill gas is extracted. Each control system may include one or more sensors for measuring one or more characteristics of a sample of extracted landfill gas (e.g., landfill gas characteristics such as gas composition and/or temperature). In some instances, the control systems may be configured to measure one or more other characteristics related to the gas extraction process (e.g., emissions, environmental conditions such as ambient pressure, temperature, wind speed, etc.), as described herein. In some instances, one or more (e.g., all) of the control systems may comprise an actuator configured to control a position of a valve disposed in well piping. Control of the valve via the actuator adjusts the flow rate at which landfill gas is extracted from the respective gas stream to which the valve is coupled.

The control systems may be configured to communicate with an external device, remote to the landfill, such as at least one server. For example, sensor measurements may be communicated from the control systems to the at least one server for the purposes of performing monitoring (e.g., storing and/or transmitting sensor data, generating alerts, determining compliance with one or more local, state, and/or federal requirements) and/or control (e.g., determining whether and/or how to adjust a flow rate of landfill gas being extracted from the landfill, for example, with a control valve). The external device may also communicate information to one or more of the control systems, such as instructions for adjusting the flow rate of landfill gas being extracted from the landfill, firmware updates, and/or one or more operating parameters to be applied to the control systems.

A communication node device may be used to communicate data from a control system to the at least one server. For example, each control system may be coupled to a communication node device which transmits information provided by the control system (e.g., one or more sensor measurements). A communication node device may also receive information from the at least one server which may be used to update the control system, including adjusting how the control system operates.

Conventional techniques for communication in the context of a landfill gas extraction system arrange communication node devices to communicate using a mesh networking protocol. In this arrangement, each communication node device on the network is required to function as a repeater, not only servicing its own communication, but also relaying data for neighboring communication node devices.

The inventors have recognized that there are drawbacks with conventional techniques for communicating information in the context of a landfill gas extraction system. For example, configuring each communication node device in a network to function as a repeater for neighboring communication node devices by relaying data from the neighboring communication node devices requires more computing power, more complex software, and consumes more energy. These drawbacks increase the cost of building and running the communication system and/or shutting down of the communication system (e.g., where a power source becomes depleted due to the high energy consumption of communication system components). To address these issues with conventional techniques for communicating information in the context of a landfill gas extraction system, the inventors have developed new communication systems and methods for using same.

In view of the importance of providing real time data monitoring and optimization of the gas extraction process based on the monitored data, the inventors have developed new devices and techniques for low power wireless networking for landfill gas extraction systems. Such devices and techniques utilize a low power wide area networking (LPWAN) protocol, such as a long range wide area network (LoRaWAN) protocol. LPWAN is a class of communication protocols which facilitates long range communications over a wide area network. When using LPWAN, the communication node devices and one or more gateway devices may be arranged in a star network configuration, rather than in a mesh network configuration. In a star network configuration, "node" devices communicate with an external device (e.g., at least one server) via a "gateway" device. The gateway device serves as an intermediary between the communication node devices and the at least one server, as the communication node devices may not have the ability to communicate directly with the at least one server via a cellular connection.

Use of an LPWAN protocol, such as LoRaWAN, enables the use of a star network in the context of a landfill gas extraction system, as the long range communications facilitated by a communications technique such as LoRa avoid the requirement for the individual communication node devices to function as repeaters for neighboring communication node devices. In particular, the long range communication provided by a LPWAN protocol such as LoRaWAN can span for miles, which allows each communication node device to communicate directly with the gateway device. The gateway device communicates with the at least one server, which may store and/or process the information received from the communication node devices, make one or more decisions based on the received information, and/or send communications (e.g., instructions) back to one or more of the communication node devices via the gateway device.

The devices and techniques for low power wide area networking described herein improve on conventional techniques for communicating information in the context of a landfill gas extraction system in a number of key ways. For example, LPWAN communication protocols such as LoRaWAN facilitate long range communications eliminating the need for communication node devices to function as repeaters thereby lowering power consumption and software complexity. In addition, because communication is point-to-point between a respective communication node device and gateway device, the system has fewer points of failure. LPWAN protocols are standardized and secure and offer built-in encryption. The communications techniques described herein eliminate the need for an Internet connection (e.g., cellular, satellite, WiMAX, Ethernet, etc.) for the communication node devices, which enables the devices and techniques described herein to be implemented at landfills with poor or no wireless Internet service and avoids the costs of providing such coverage, which can be high. In addition, the low power wide area networking devices and techniques can be integrated into existing technology for monitoring and/or controlling extraction of landfill gas from a landfill, as described herein.

Adapting LPWAN for use communicating information in a landfill gas extraction environment presents a number of challenges that the inventors have addressed with the design of the technology described herein. For example, a disadvantage of an LPWAN protocol is that communication using this protocol involves relatively low data rates and small packet sizes. By contrast, communication node devices may need to communicate a large amount of data. For example, each communication node device may transmit data at a particular data rate (e.g., at least one, and in some instances, multiple sensor measurements of a respective landfill gas characteristic to the at least one server per minute, per hour, per day, etc.). Multiple landfill gas characteristics may be monitored, and therefore each communication node device transmits multiple sensor measurements to the at least one server per hour. In addition, each gateway device may be configured to service hundreds of communication node devices. In total, thousands of measurements may be communicated over the communication system each hour. Therefore, performance of landfill gas extraction monitoring and control requires communicating large amounts of large pieces of data, which may be challenging when communicating according to an LPWAN protocol.

While the use of LPWAN protocols are advantageous in some respects, as they enable long range data transmission, the inventors have recognized that addressing the limitations on message size for messages transmitted via LPWAN protocols would facilitate the implementation of LPWAN protocols for transmitting data in a landfill gas extraction system. According to LPWAN protocols, a limit on the size of a message transmitted over a LPWAN protocol such as LoRaWAN may be 242 bytes. In some instances, for example, where signal strength is low, message sizes may be limited even further. For example, message sizes no more than 125 bytes, no more than 53 bytes, no more than 20 bytes, and as low as 11 bytes may be required. On the other hand, the size of the information being relayed by the systems described herein (e.g., measurements of landfill gas characteristics) may be quite large, for example, approximately 4300 bytes. To address the size limitations for messages transmitted over a LPWAN protocol, the inventors have recognized that messages transmitted between the communication node devices and the at least one server, via a gateway device, could be encoded into smaller packets of limited size in order to be transmitted. Accordingly, the inventors have developed techniques which include encoding messages (e.g., containing sensor measurement data and related metadata) into a plurality of packets for transmission. Upon receipt by the at least one server and/or a communication node device, the packets are decoded to decipher the data stored within the message packets.

The inventors have further developed techniques for configuring a communication system comprising one or more gateway devices and multiple communication node devices for operation. The techniques provide for positioning the gateway device in an optimal location for carrying out the necessary communications capabilities in the context of landfill gas extraction monitoring and control. The positioning of the gateway device may be evaluated and adjusted based on an evaluation of the quality of LPWAN communications between the gateway device and multiple communication node devices.

According to some aspects, there is provided a method for monitoring extraction of landfill gas from a landfill having a plurality of wells by using a communication system configured to transmit information using a low-power wide area networking (LPWAN) protocol (such as a long range wide area network (LoRaWAN) protocol), the communication system comprising one or more gateway devices including a first gateway device and a plurality of communication node devices including a first communication node device, the method comprising: obtaining, at the first communication node device and from a first control system configured to monitor and/or control extraction of landfill gas at a first well of the plurality of wells, information comprising a set of one or more measurements of one or more landfill gas characteristics of landfill gas being extracted from the first well and/or other data; encoding the set of one or more measurements of the one or more landfill gas characteristics and/or other data in a first set of one or more packets in accordance with the LPWAN protocol; transmitting the first set of one or more packets from the first communication node device to the first gateway device using the LPWAN protocol; transmitting the first set of one or more packets from the first gateway device to at least one server; decoding, using the at least one server, the first set of one or more packets to obtain the set of one or more measurements of the one or more landfill gas characteristics; and determining, using the at least one server and the set of one or more measurements of the one or more landfill gas characteristics and/or other data, whether to perform an action.

In some embodiments, determining whether to perform an action comprises comparing the set of one or more measurements of the one or more landfill gas characteristics to at least one threshold.

In some embodiments, the action comprises transmitting an alert indicating that at least one of the landfill gas characteristics is outside of a target range, below a first threshold value, and/or above a second threshold value. In some embodiments, the action comprises outputting an indication that the landfill gas extracted from the first well is in compliance with one or more local, state, and/or federal requirements.

In some embodiments, the action comprises transmitting a command to the first communication node device that is to be provided by the first communication node device to the first control system, the command instructing the first control system to adjust a flow rate of landfill gas being extracted from the first well. Transmitting the command may comprise: encoding the command in a second set of one or more packets in accordance with the LPWAN protocol; transmitting the second set of one or more packets from the at least one server to the first gateway device; transmitting the second set of one or more packets from the first gateway device to the first communication node device; decoding, using the first communication node device, the second set of one or more packets to obtain the command instructing the first control system to adjust the flow rate of landfill gas being extracted from the first well; and providing the command to the first control system. In some embodiments the method further comprises using the first control system to adjust, based on the command, a position of a valve of the first well.

In some embodiments, the one or more measurements of the one or more landfill gas characteristics comprises one or more measurements of a concentration of at least one constituent gas (e.g., methane, carbon dioxide, oxygen, nitrogen, hydrogen sulfide, balance gas) in the landfill gas extracted from the first well. In some embodiments, the one or more landfill gas characteristics comprises gas temperature.

In some embodiments, the first communication node device comprises hardware and/or software configured to encode the first set of one or more packets. In some embodiments, the first communication node device comprises hardware and/or software configured to decode a second set of one or more packets.

In some embodiments, a size of each packet of the first set of one or more packets is greater than or equal to 1 byte and less than or equal to 242 bytes. In some embodiments, a size of each packet of the first set of one or more packets is greater than or equal to 1 byte and less than or equal to 125 bytes. In some embodiments, a size of each packet of the first set of one or more packets is greater than or equal to 1 byte and less than or equal to 53 bytes. In some embodiments, a size of each packet of the first set of one or more packets is greater than or equal to 1 byte and less than or equal to 11 bytes.

In some embodiments, the set of one or more measurements further comprise one or more measurements of one or more characteristics of ambient air external to the first control system. In some embodiments, the set of one or more measurements further comprise one or more measurements of pressure in well piping through which the landfill gas is extracted from the first well. In some embodiments, the information comprises the set of one or more measurements of the one or more landfill gas characteristics.

In some embodiments, the method further comprises prior to transmitting the first set of one or more packets, determining whether to transmit (e.g., when) the first set of one or more packets based at least in part on a priority level of the set of one or more measurements relative to other data transmitted by the first communication node device. In some embodiments, the determining whether to transmit may be based on one or more other factors such as whether higher priority data is ready for transmission. In some embodiments, the method further comprises reducing a frequency at which the obtaining is performed based on a transmission bandwidth of the first communication node device. In some embodiments, the method further comprises prior to transmitting the first set of one or more packets, determining whether data that is a higher priority level than the first set of one or more packets is available to transmit and transmitting the data that is a higher priority level prior to transmitting the first set of one or more packets.

In some embodiments, transmitting the first set of one or more packets from the first gateway device to at least one server is performed using one or more of a cellular, WiFi, WiMAX, Ethernet, and/or satellite connection.

According to some aspects, there is provided a communication system configured to transmit information using a low-power wide area networking (LPWAN) protocol (such as a long range wide area network (LoRaWAN) protocol), the communication system comprising: a plurality of communication node devices including a first communication node device; one or more gateway devices including a first gateway device; and at least one server, wherein: the first communication node device is configured to: obtain from a first control system configured to monitor and/or control extraction of landfill gas at a first well of a plurality of wells in a landfill, information comprising a set of one or more measurements of one or more landfill gas characteristics of landfill gas being extracted from the first well and/or other data; encode the set of one or more measurements of the one or more landfill gas characteristics and/or other data in a first set of one or more packets in accordance with the LPWAN protocol; transmit the first set of one or more packets from the first communication node device to the first gateway device using the LPWAN protocol; and the first gateway device is configured to: transmit the first set of one or more packets from the first gateway device to the at least one server; and the at least one server is configured to: decode, using the at least one server, the first set of one or more packets to obtain the set of one or more measurements of the one or more landfill gas characteristics; determine, using the at least one server and the set of one or more measurements of the one or more landfill gas characteristics and/or other data, whether to perform an action.

In some embodiments, the at least one server is configured to determine whether to perform an action at least in part by comparing the set of one or more measurements of the one or more landfill gas characteristics to at least one threshold.

In some embodiments, the action comprises transmitting an alert indicating that at least one of the landfill gas characteristics is outside of a target range, below a first threshold, and/or above a second threshold value. In some embodiments, the action comprises outputting an indication that the landfill gas extracted from the first well is in compliance with one or more local, state, and/or federal requirements.

In some embodiments, the action comprises transmitting a command to the first communication node device that is to be provided by the first communication node to the first control system, the command instructing the first control system to adjust a flow rate of landfill gas being extracted from the first well. The at least one server may be configured to transmit the command at least in part by: encoding the command in a second set of one or more packets in accordance with the LPWAN protocol; and transmitting the second set of one or more packets from the at least one server to the first gateway device; and wherein the first gateway device is further configured to transmit the second set of one or more packets from the first gateway device to the first communication node device; and wherein the first communication node device is further configured to: decode the second set of one or more packets to obtain the command instructing the first control system to adjust the flow rate of landfill gas being extracted from the first well; and provide the command to the first control system. In some embodiments, the communication system further comprises the first control system, wherein the first control system is further configured to adjust a position of a valve of the first well based on the command.

In some embodiments, the one or more measurements of the one or more landfill gas characteristics comprises one or more measurements of a concentration of at least one constituent gas (e.g., methane, nitrogen, oxygen, carbon dioxide, hydrogen sulfide, balance gas) in the landfill gas extracted from the first well. In some embodiments, the one or more landfill gas characteristics comprises gas temperature.

In some embodiments, the first communication node device comprises hardware and/or software configured to encode the first set of one or more packets. In some embodiments, the first communication node device comprises hardware and/or software configured to decode a second set of one or more packets.

In some embodiments, a size of each packet of the first set of one or more packets is greater than or equal to 1 byte and less than or equal to 242 bytes. In some embodiments, a size of each packet of the first set of one or more packets is greater than or equal to 1 byte and less than or equal to 125 bytes. In some embodiments, a size of each packet of the first set of one or more packets is greater than or equal to 1 byte and less than or equal to 53 bytes. In some embodiments, a size of each packet of the first set of one or more packets is greater than or equal to 1 byte and less than or equal to 11 bytes.

In some embodiments, the set of one or more measurements further comprise one or more measurements of one or more characteristics of ambient air external to the first control system. In some embodiments, the set of one or more measurements further comprise one or more measurements of pressure in well piping through which the landfill gas is extracted from the landfill.

In some embodiments, the information comprises the set of one or more measurements of the one or more landfill gas characteristics.

In some embodiments, the first communication node is further configured to prior to transmitting the first set of one or more packets, determine whether to transmit (e.g., when) the first set of one or more packets based at least in party on a priority level of the set of one or more measurements relative to other data transmitted by the first communication node device. In some embodiments, the determining whether to transmit may be based on one or more other factors such as whether higher priority data is ready for transmission. In some embodiments, the first communication node is further configured to reduce a frequency at which the obtaining is performed based on a transmission bandwidth of the first communication node device. In some embodiments, the first communication node is further configured to prior to transmitting the first set of one or more packets, determine whether data that is a higher priority level than the first set of one or more packets is available to transmit and transmit the data that is a higher priority level prior to transmitting the first set of one or more packets.

In some embodiments, the first communication node is configured to transmit the first set of one or more packets from the first gateway device to at least one server using one or more of a cellular, WiFi, WiMAX, Ethernet, and/or satellite connection.

According to some aspects, there is provided a method for monitoring extraction of landfill gas from a landfill having a plurality of wells by using a communication system configured to transmit information using a low-power wide area networking (LPWAN) protocol (such as a long range wide area network (LoRaWAN) protocol), the communication system comprising one or more gateway devices including a first gateway device and a plurality of communication node devices including a first communication node device, the method comprising: obtaining, at the first communication node device and from a first control system configured to monitor and/or control extraction of landfill gas at a first well of the plurality of wells, information comprising a set of one or more measurements of one or more landfill gas characteristics of landfill gas being extracted from the first well and/or other data; encoding the set of one or more measurements of the one or more landfill gas characteristics and/or other data in a first set of one or more packets in accordance with the LPWAN protocol; transmitting the first set of one or more packets from the first communication node device to the first gateway device using the LPWAN protocol; transmitting the first set of one or more packets from the first gateway device to at least one server; receiving, with the first gateway device, a second set of one or more packets from the at least one server, the second set of packets being encoded from a command from the at least one server to adjust, with the first control system, a flow rate of landfill gas being extracted from the first well; transmitting the second set of one or more packets from the first gateway device to the first communication node; decoding, using the first communication node, the second set of one or more packets to obtain the command to adjust the flow rate of landfill gas being extracted from the first well; and adjusting a position of a valve of the first well based on the command.

In some embodiments, the one or more measurements of the one or more landfill gas characteristics comprises one or more measurements of a concentration of at least one constituent gas (e.g., methane, nitrogen, carbon dioxide, oxygen, hydrogen sulfide, balance gas) in the landfill gas extracted from the first well. In some embodiments, the one or more landfill gas characteristics comprises gas temperature.

In some embodiments, the first communication node device comprises hardware and/or software configured to encode the first set of one or more packets. In some embodiments, the first communication node device comprises hardware and/or software configured to decode the second set of one or more packets.

In some embodiments, a size of each packet of the first set of one or more packets is greater than or equal to 1 byte and less than or equal to 242 bytes. In some embodiments, a size of each packet of the first set of one or more packets is greater than or equal to 1 byte and less than or equal to 125 bytes. In some embodiments, a size of each packet of the first set of one or more packets is greater than or equal to 1 byte and less than or equal to 53 bytes. In some embodiments, a size of each packet of the first set of one or more packets is greater than or equal to 1 byte and less than or equal to 11 bytes.

In some embodiments, the set of one or more measurements further comprise one or more measurements of one or more characteristics of ambient air external to the first control system. In some embodiments, the set of one or more measurements further comprise one or more measurements of pressure in well piping through which the landfill gas is extracted from the first well.

In some embodiments, the information comprises the set of one or more measurements of the one or more landfill gas characteristics.

According to some aspects, there is provided a communication system configured to transmit information using a low-power wide area networking (LPWAN) protocol (such as a long range wide area network (LoRaWAN) protocol), the communication system comprising: a plurality of communication node devices including a first communication node device; and one or more gateway devices including a first gateway device; wherein: the first communication node device is configured to: obtain from a first control system configured to monitor and/or control extraction of landfill gas at a first well of a plurality of wells in a landfill, information comprising a set of one or more measurements of one or more landfill gas characteristics of landfill gas being extracted from the first well and/or other data; encode the set of one or more measurements of the one or more landfill gas characteristics and/or other data in a first set of one or more packets in accordance with the LPWAN protocol; transmit the first set of one or more packets from the first communication node device to the first gateway device using the LPWAN protocol; the first gateway device is configured to: transmit the first set of one or more packets from the first gateway device to at least one server; receive a second set of one or more packets from the at least one server, the second set of packets being encoded from a command from the at least one server to adjust, with the first control system, a flow rate of landfill gas being extracted from the first well; and transmit the second set of one or more packets from the first gateway device to the first communication node; and the first communication node device is further configured to: decode, using the first communication node, the second set of one or more packets to obtain the command to adjust the flow rate of landfill gas being extracted from the first well; and provide the command to the first control system, wherein the first control system is configured to adjust a position of a valve of the first well based on the command.

In some embodiments, the one or more measurements of the one or more landfill gas characteristics comprises one or more measurements of a concentration of at least one constituent gas (e.g., methane, nitrogen, carbon dioxide, oxygen, hydrogen sulfide, balance gas) in the landfill gas extracted from the first well. In some embodiments, the one or more landfill gas characteristics comprises gas temperature.

In some embodiments, the first communication node device comprises hardware and/or software configured to encode the first set of one or more packets. In some embodiments, the first communication node device comprises hardware and/or software configured to decode a second set of one or more packets.

In some embodiments, a size of each packet of the first set of one or more packets is greater than or equal to 1 byte and less than or equal to 242 bytes. In some embodiments, a size of each packet of the first set of one or more packets is greater than or equal to 1 byte and less than or equal to 125 bytes. In some embodiments, a size of each packet of the first set of one or more packets is greater than or equal to 1 byte and less than or equal to 53 bytes. In some embodiments, a size of each packet of the first set of one or more packets is greater than or equal to 1 byte and less than or equal to 11 bytes.

In some embodiments, the set of one or more measurements further comprise one or more measurements of one or more characteristics of ambient air external to the first control system. In some embodiments, the set of one or more measurements further comprise one or more measurements of pressure in well piping through which the landfill gas is extracted from the landfill.

In some embodiments, the information comprises the set of one or more measurements of the one or more landfill gas characteristics.

According to some aspects, there is provided a method for configuring a communication system comprising one or more gateway devices including a first gateway device and multiple communication node devices including a first communication node device, the method comprising: (A) identifying an initial landfill location in a region of a landfill at which to position a first gateway device; (B) positioning the first gateway device at the initial landfill location; (C) obtaining information identifying the multiple communication node devices; (D) configuring, using the information identifying the multiple communication node devices, the first gateway device to communicate with the multiple communication node devices using a low power wide area networking (LPWAN) protocol (such as a long range wide area network (LoRaWAN) protocol); (E) evaluating quality of LPWAN communications between the first gateway device and the multiple communication node devices by transmitting test signals between the first gateway device and individual ones of the multiple communication node devices; (F) determining, based on results of the evaluating, whether to continue operating the first gateway device at the initial landfill location; (G) when it is determined to continue operating the first gateway device at the initial landfill location, operating the first gateway device at the initial landfill location; and (H) when it is determined not to continue operating the first gateway device at the initial location, identifying one or more other landfill locations at which to position the first gateway device and performing steps (E)-(F) until it is determined that a particular one of the one or more other landfill locations provides sufficient quality LPWAN communications between the first gateway device and the multiple communication node devices.

In some embodiments, evaluating quality of LPWAN communications between the first gateway device and the multiple communication node devices by transmitting the test signals comprises encoding, with a first communication node device of the multiple communication node devices, information comprising one or more measurements of one or more landfill gas characteristics of landfill gas being extracted from a first well of a plurality of wells in the landfill and/or other data in a first set of one or more packets in accordance with the LPWAN protocol; and transmitting the first set of one or more packets from the first communication node device to the first gateway device. In some embodiments, evaluating quality of LPWAN communications between the first gateway device and the multiple communication node devices by transmitting the test signals further comprises transmitting the first set of one or more packets from the first gateway device to at least one server. In some embodiments, evaluating quality of LPWAN communications between the first gateway device and the multiple communication node devices by transmitting the test signals further comprises decoding, using the at least one server, the first set of one or more packets to obtain the set of one or more measurements of the one or more landfill gas characteristics and/or other data. In some embodiments, the information comprises the set of one or more measurements of the one or more landfill gas characteristics.

In some embodiments, evaluating quality of LPWAN communications between the first gateway device and the multiple communication node devices by transmitting the test signals further comprises receiving, with the first gateway device, a second set of packets from at least one server, the second set of packets being encoded from a command from the at least one server to adjust a flow rate of landfill gas being extracted from a first well of a plurality of wells in the landfill. In some embodiments, evaluating quality of LPWAN communications between the first gateway device and the multiple communication node devices by transmitting the test signals further comprises transmitting the second set of packets from the first gateway device to the first communication node device. In some embodiments, evaluating quality of LPWAN communications between the first gateway device and the multiple communication node devices by transmitting the test signals further comprises decoding, using the first communication node device, the second set of packets to obtain the command to adjust the flow rate of landfill gas being extracted from the first well.

In some embodiments, evaluating quality of LPWAN communications between the first gateway device and the multiple communication node devices comprises evaluating signal strengths of the test signals transmitted between the first gateway device and the individual ones of the multiple communication node devices when received by the individual ones of the multiple communication node devices.

In some embodiments, the initial landfill location is a point in the region of the landfill having a highest elevation. In some embodiments, the initial landfill location is within a threshold maximum distance from a center of the region of the landfill.

In some embodiments, identifying the initial landfill location comprises identifying a location in the region of the landfill having an Ethernet connection. In some embodiments, identifying the initial landfill location comprises identifying a location in the region of the landfill that is inactive.

In some embodiments, the method further comprises in response to determining not to continue operating the first gateway at the initial landfill location, installing at least one second gateway device of the one or more gateway devices in the region of the landfill.

In some embodiments, the method further comprises installing the multiple communication node devices at a plurality of locations within the region comprising the landfill. Installing the multiple communication node devices may comprise selecting a type of LPWAN protocol for each communication node device of the multiple communication node devices from at least two different types of LPWAN protocols. In some embodiments, selecting the type of LPWAN protocol for each communication node device is based on whether the communication node device is coupled to a control system configured to adjust a flow rate of landfill gas being extracted from the landfill.

The aspects and embodiments described above, as well as additional aspects and embodiments, are described further below. These aspects and/or embodiments may be used individually, all together, or in any combination, as the application is not limited in this respect.

FIG. 1 illustrates an example environment 100 in which aspects of the technology described herein may be implemented. The illustrative environment 100 includes a landfill 102 which holds decomposing waste 104. The decomposing waste 104 produces landfill gas (LFG) 106 which is extracted through a gas extraction well 108. The gas extraction well includes a wellhead 110 through which a control system 112 (i.e., a control module, as described herein) is coupled to the gas extraction well 108. The control system 112 may be configured to control extraction of gas via the gas extraction well 108. An output of the gas extraction system may be coupled to a gas collection system 114, which collects the landfill gas 106 extracted through the gas extraction well 108. The gas collection system 114 supplies the extracted landfill gas to a power plant 116. Although in the example embodiment shown in FIG. 1, a single wellhead 110 is shown, in some embodiments, the environment 100 may include multiple wellheads at multiple sites. In such embodiments, the landfill gas may be extracted from the multiple sites.

In some embodiments, the gas collection system 114 includes a vacuum source. The vacuum source generates a negative pressure differential between the gas collection system 114 and the landfill 102. The negative pressure differential causes the landfill gas 106 to flow from the landfill 102 to the gas collection system 114 through the gas extraction well 108. Extracted landfill gas is suppled to power plant 116 which may be configured to convert the extracted landfill gas into electrical power. In some embodiments, the extracted landfill gas may additionally or alternatively be supplied to one or more other locations, and/or used for other purposes In some embodiments, the control system 112 controls extraction of the landfill gas 106 through the gas extraction well 108. In some embodiments, the control system 112 may be configured to operate to control extraction of landfill gas to achieve a desired outcome or outcomes with respect to energy content of extracted landfill gas, composition of extracted landfill gas, flow rate of gas extraction, regulatory requirements, and/or other parameters. In some embodiments, the control system 112 may include multiple components that operate to achieve the outcome(s), as discussed in more detail herein.

Figure 2A:
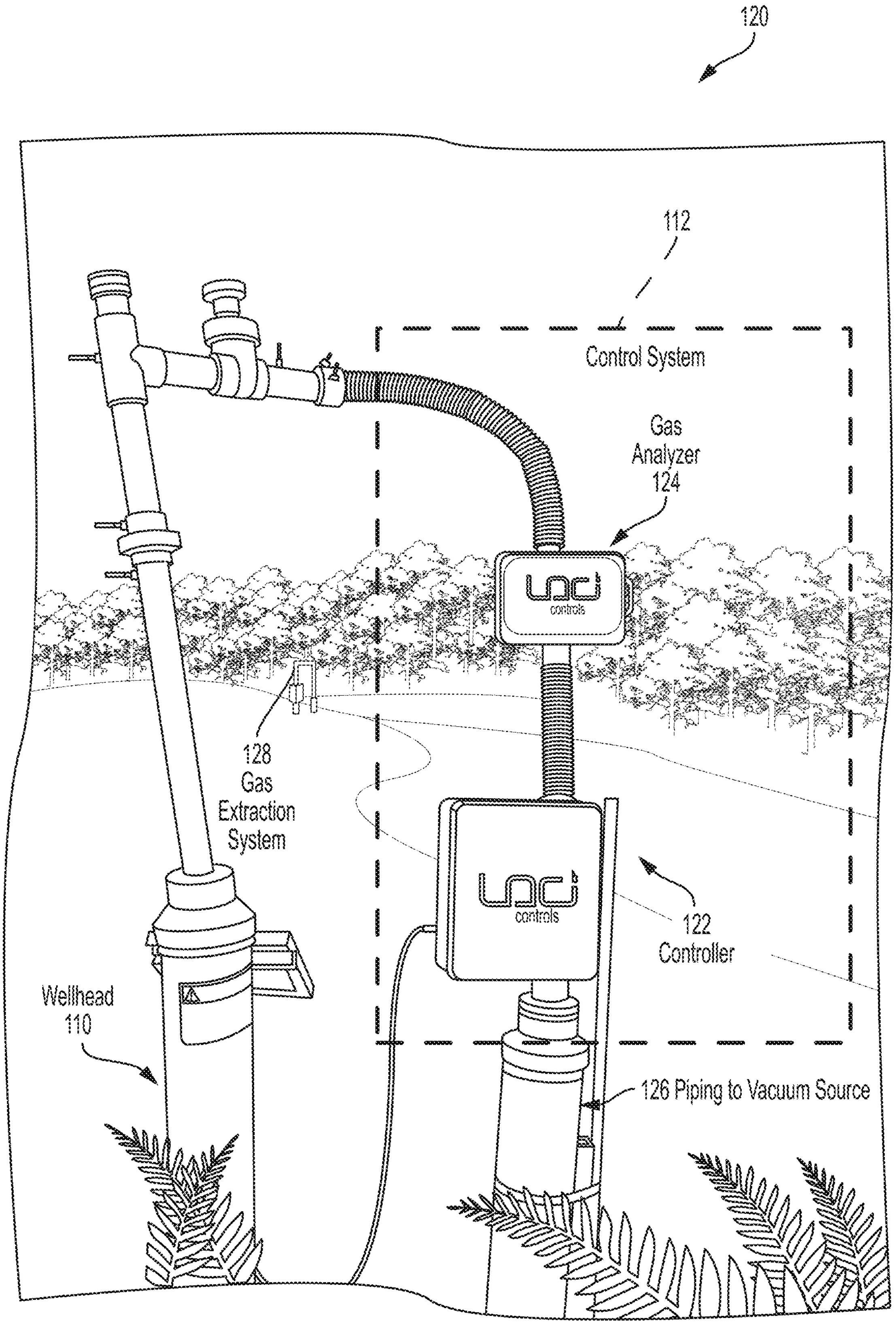
FIG. 2A shows an example control system for landfill gas extraction, in accordance with some embodiments of the technology described herein.

FIG. 2A illustrates an example implementation of the control system 112 for a landfill gas extraction system 120. The gas extraction well 108 may be coupled to the vacuum source through the piping 126 that leads to the vacuum source. Landfill gas may flow from the gas extraction well 108 towards the vacuum source via the piping 126. In some embodiments, the control system 112 is disposed within the piping 126 such that the control system 112 controls the flow of gas from the wellhead 110 to the vacuum source via the piping 126. The control system 112 includes a gas analyzer 124 which the control system 112 uses to determine one or more characteristics of the extracted landfill gas. The control system 112 includes a controller 122 that uses the determined characteristic(s) to control extraction of landfill gas. In some embodiments, the controller 122 may be configured to use the measured characteristic(s) to control a flow rate of landfill gas extraction. For example, the controller 122 may be configured to use the measured characteristic(s) to control a position of a throttle that controls the flow rate of landfill gas being extracted.

In some embodiments, the gas analyzer 124 may be configured to collect and analyze extracted landfill gas. The gas analyzer 124 may be configured to include one or more sensors to measure the characteristic(s) of the extracted landfill gas. In some embodiments, the gas analyzer 124 may be configured to use the sensor(s) to measure composition, temperature, and/or other characteristic of the extracted landfill gas. In some embodiments, the gas analyzer may be configured to use the sensor(s) to measure the characteristic (s) of landfill gas when the gas is extracted (e.g., before being analyzed by the gas analyzer 124). For example, the sensor(s) may be used to measure concentration of methane, carbon dioxide, oxygen, and/or hydrogen sulfide. The sensor (s) may comprise, for example, infrared sensors, catalytic beads, electrochemical sensors, photoionization detectors, zirconium oxide sensors, thermal conductive detectors, and/or any other suitable sensing technology for measuring the characteristic(s) of the landfill gas, as aspects of the technology described herein are not limited to using a particular type of sensor.

In some embodiments, the gas analyzer 124 may be configured to determine one or more characteristics of the environment (e.g., ambient temperature, atmospheric pressure, wind direction, wind speed, precipitation, humidity, concentration of emission of a greenhouse gas such as methane, carbon dioxide, and/or hydrogen sulfide), and/or gas in the landfill (e.g., temperature, composition, humidity). The gas analyzer 124 may include one or more sensors to obtain measurements of the characteristic(s). The sensors can include, for example, temperature sensors, humidity sensors, pH sensors, pressure sensors and/or any other type of sensor(s) for sensing environmental characteristics.

In some embodiments, the controller 122 may be configured to control one or more parameters of landfill gas extraction. In some embodiments, the controller 122 may be configured to control a flow rate of landfill gas being extracted from the landfill 102. In some embodiments, the control system 112 may include a flow control mechanism to control a flow rate of landfill gas extraction. For example, the control system 112 may include a throttle that includes an actuation mechanism for changing the position of the throttle to control the flow rate. The controller 122 may be configured to determine and apply settings to the throttle to control the flow rate of landfill gas extraction (e.g., operate the actuation mechanism to change the position of the throttle to a determined position). In some embodiments, the control mechanism is placed between the gas extraction well 108 and the gas collection system 114 such that gas being extracted through the gas extraction well 108 flows through the control mechanism on its way to the gas collection system 114.

In some embodiments, the throttle may include a motor that generates a force by which to adjust the position of the throttle. The controller 122 may be configured to control the position of the throttle using the motor. In some embodiments, the controller 122 may be configured to control a flow rate of landfill gas extracted from the landfill by controlling the position of the throttle. For example, by changing the throttle position to increase the portion of the aperture that is blocked, the controller 122 may increase the flow rate of landfill gas; and by changing the throttle position to decrease the portion of the aperture that is blocked by the plate, the controller 122 may decrease the flow rate of landfill gas.

In some embodiments, the controller 122 may be coupled to the gas analyzer 124. The controller 122 may be configured to use measurements obtained by the gas analyzer 124 to determine the control parameter(s). In some embodiments, the controller 122 may be configured to regulate the landfill gas flow rate based on the measurements obtained by the gas analyzer 124. For example, in some embodiments, measurements obtained by the gas analyzer 124 may be transmitted to at least one server, and the at least one server may use the measurements to determine whether and/or how to adjust the gas flow rate.

To adjust the flow rate, in some embodiments, the controller 122 may be configured to adjust a throttle position to modify the flow rate. The controller 122 may be configured to control an actuation mechanism (e.g., a motor) to move the position of the throttle in order to obtain a position. The controller 122 may adjust the flow rate based on an instruction received from the at least one server.

Example systems and techniques for controlling extraction of landfill gas are described in U.S. Patent Application Publication No. 2017/0216893, entitled "DEVICES AND TECHNIQUES RELATING TO LANDFILL GAS EXTRACTION" filed on Mar. 13, 2017, incorporated herein by reference. Some embodiments may include one or more features of embodiments described in the referenced application.

In some embodiments, multiple wells or gas extraction systems may be located at a landfill to extract gas from the landfill. For example, FIG. 2A illustrates another well and gas extraction system 128 located at the landfill. In some embodiments, multiple gas extraction systems at the landfill may include the control system 112 for controlling extraction of landfill gas from the landfill. For example, gas extraction system may include the control system 112 to control extraction of landfill gas via the gas extraction system 128.

Although the gas analyzer 124 and the controller 122 are shown as separate components in FIG. 1, in some embodiments, the gas analyzer 124 and controller 122 may be portions of a single unit. Some embodiments are not limited to any particular arrangement or combination of the gas analyzer 124 and the controller 122. In some embodiments, functionality described for each of the gas analyzer 124 and the controller 122 may be interchanged between the two components, as some embodiments of the technology described herein are not limited in this respect.

As described herein, the inventors have recognized the importance of providing real time data monitoring and optimization of the gas extraction process based on the monitored data while also recognizing that existing systems are not equipped to provide necessary communications capabilities where there is little to no cell coverage. Accordingly, the inventors have developed techniques for low power wireless communications for landfill gas extraction systems that can be implemented in landfills which may have little to no cell coverage. The techniques described herein comprise one or more node devices and one or more gateway devices arranged in a star network configuration and configured to communicate using an LPWAN protocol. The one or more gateway devices may be further configured to communicate with an external device, such as at least one server, thereby enabling communication between the one or more node devices and the at least one server even when the one or more node devices lack a cellular connection.

Figure 2B:
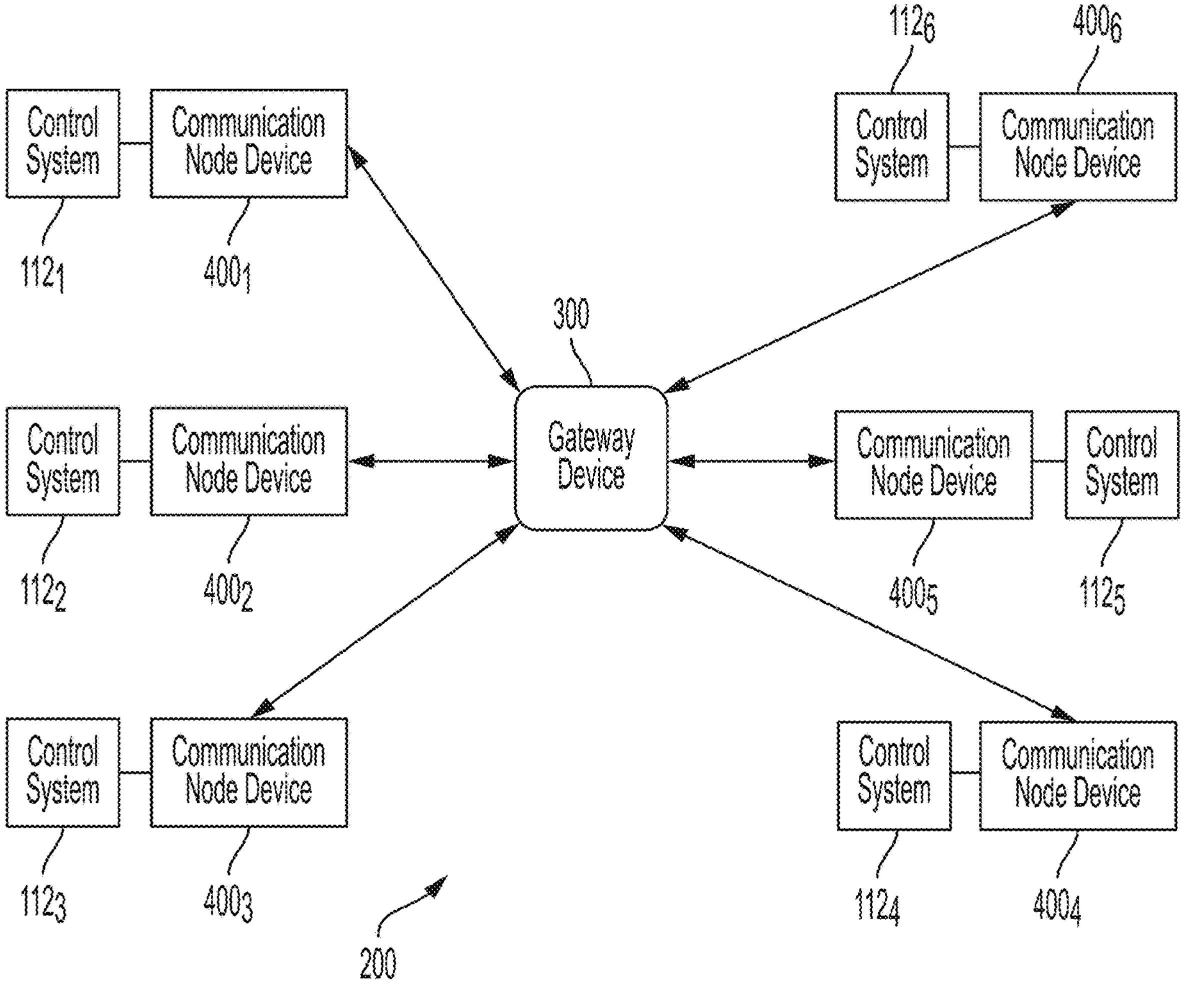
FIG. 2B is a schematic diagram illustrating communication between example gateway devices and communication node devices, in accordance with some embodiments of the technology described herein.

FIG. 2B is a schematic diagram illustrating communication between example gateway devices and communication node devices, in accordance with some embodiments of the technology described herein. As shown in FIG. 2B, the example communication system 200 comprises a gateway device 300 and multiple communication node devices $\mathbf{400}_1$-$\mathbf{400}_6$.

As can be seen in FIG. 2B, the communication system 200 is arranged in a star network configuration. In the star network configuration, each communication node device 400 communicates directly with the gateway device 300. Each of the communication node devices $\mathbf{400}_1$-$\mathbf{400}_6$ communicate with the gateway device 300 using a LPWAN protocol. For example, in some embodiments, the communication node devices $400_1$-$400_6$ use LoRa communications transmitted using a LoRaWAN protocol to communicate with the gateway device 300.

The gateway device 300 may have a communication connection to at least one server. The connection from the gateway device 300 to the at least one server may be according to any suitable communication protocol, for example, cellular, WiFi, WiMAX, Ethernet, satellite (e.g., Starlink), or other suitable communication protocol.

As shown in FIG. 2B, each communication node device $400_1$-$400_6$ is coupled to a respective control system $112_1$-$112_6$. For example, each communication node device is configured to receive information from a respective control system, such as sensor measurements of one or more landfill gas characteristics of extracted landfill gas. In some embodiments, the communication node devices may further be configured to transmit information to the respective control systems to which the communication node devices are coupled. For example, the respective communication node devices may be configured to transmit commands to the control system. The command may comprise an instruction to adjust a position of a valve disposed in well piping (e.g., adjust a degree to which the valve is open). In some embodiments, the command may comprise a firmware update to be applied to the control system. In some embodiments, the command may comprise an instruction to adjust one or more operating parameters of the control system, such as a frequency at which the control systems measures a landfill gas characteristic. In some embodiments, each communication node device may be mechanically coupled to a respective control system.

Although in the illustrated embodiment six communication node devices and corresponding control systems are shown, it should be appreciated that the communication system 200 may comprise additional or fewer communication node devices. For example, a wellfield may have hundreds of communication node devices communicating with a gateway device 300. In some embodiments, the communication system may include additional gateway devices configured to communicate with the same or additional communication node devices.

In some embodiments, each gateway device of the communication system 200 may communicate with 100 or more communication node devices. Each gateway device may be configured to receive signals from up to eight communication node devices at once. In some embodiments, each gateway device may be configured to transmit signals to one communication node device at a time.

Figure 3:
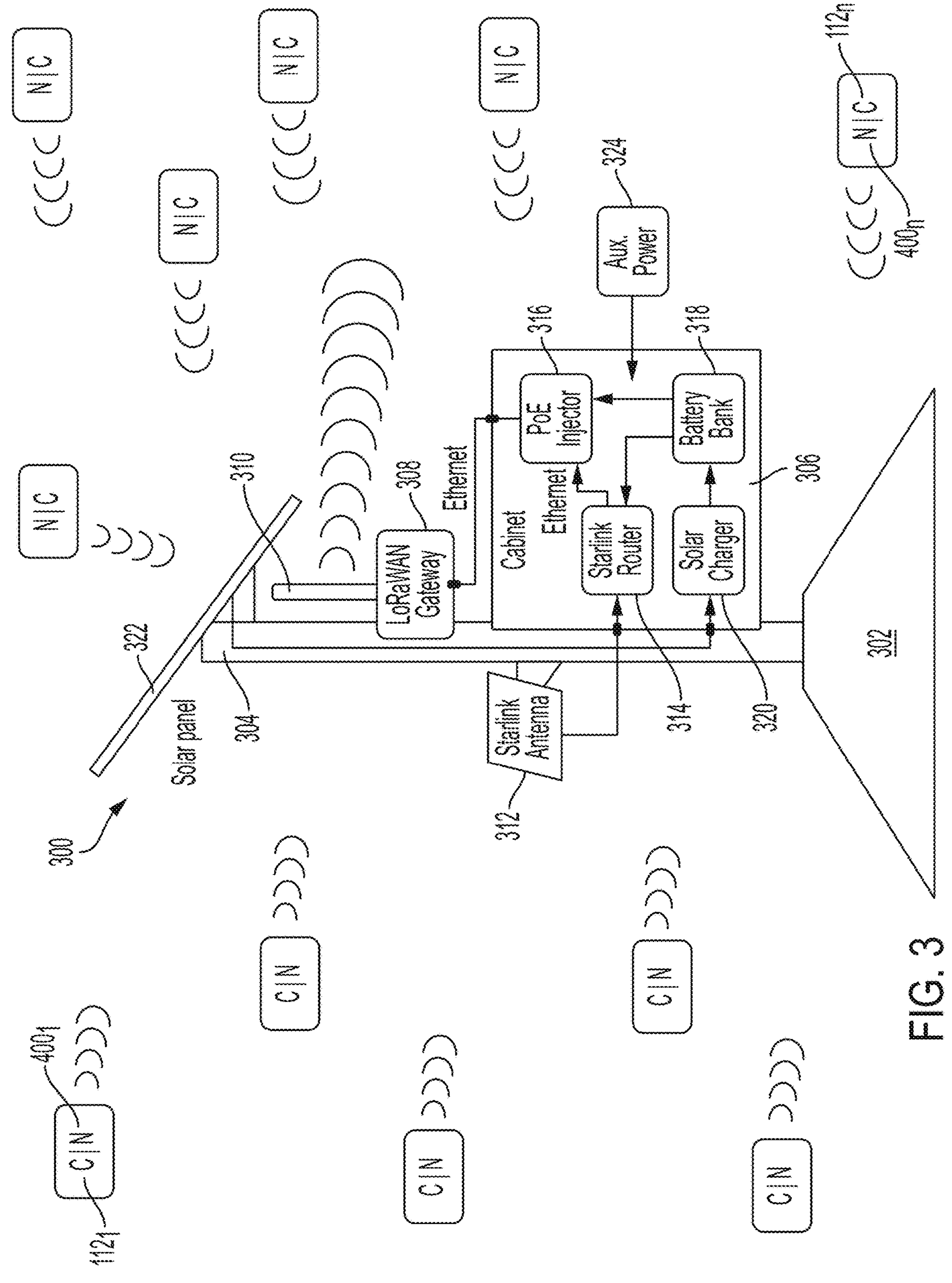
FIG. 3 is a schematic diagram of an example gateway device, in accordance with some embodiments of the technology described herein.

FIG. 3 is a schematic diagram of an example gateway device 300, in accordance with some embodiments of the technology described herein. The communication systems described herein comprise one or more gateway devices which may act as an intermediary between one or more communication node devices and at least one server. Accordingly, the gateway devices described herein are configured to communicate with the one or more communication node devices and the at least one server.

The gateway device may be placed in a location that maximizes a line of sight between the gateway device and the one or more communication node devices. For example, the gateway device may be placed in a location central to the one or more communication node devices and/or may be placed at a point of the landfill having a highest elevation. Techniques for determining a location to place the one or more gateway devices are described herein.

In some embodiments, the gateway device may be provided by a third party or municipality. In some embodiments, the gateway device may comprise a preexisting device positioned in a region of the landfill.

As shown in FIG. 3, gateway device 300 comprises a base 302 and frame 304. The frame 304 may be comprised of one or more struts. Although the illustrated embodiment of FIG. 3 illustrates only one strut, the gateway device 300 may include multiple struts. The strut(s) may be hammered into the ground of the landfill and/or attached to another rigid structure.

The base 302 and frame 304 provide support for other components of the gateway device 300, which may be mounted to the base 302 and/or frame 304. In some embodiments, the frame may be designed to be wind resistant. In some embodiments, the gateway device 300 may be approximately 6-8 feet tall.

The gateway device 300 comprises an enclosure 306. The enclosure 306 houses one or more components of the gateway device 300, such as the solar charger 320, battery 318, router 314, and Power-over-Ethernet injector 316. In some embodiments, the enclosure 306 may house one or more additional components, such as the LoRaWAN gateway 308. In some embodiments, the gateway device 300 may include multiple enclosures, and components of the gateway device 300 may be separated between the multiple enclosures. The enclosure 306 may be weather resistant, for example, designed to withstand high and/or low temperatures, wind, and/or rain. In some embodiments, the enclosure 306 may comprise insulation and/or other heat retaining features.

The gateway device 300 further comprises LoRaWAN gateway 308. As described herein, the gateway device 300 is configured to communicate with multiple communication node devices according to an LPWAN protocol. The gateway device includes a gateway radio for enabling communications with the multiple communication node devices according to the selected LPWAN protocol. In some embodiments, the selected LPWAN protocol is LoRaWAN. Accordingly, the gateway radio of the gateway device may be a LoRaWAN gateway, as shown in the illustrated embodiment of FIG. 3. The LoRaWAN gateway 308 is a radio module that facilitates communication with other devices (e.g., communication node devices $400_1$-$400_N$ shown in FIG. 3). The LoRaWAN gateway 308 comprises a first antenna 310 for transmitting and receiving communications from the one or more communication node devices $400_1$-$400_n$). In some embodiments, the first antenna 310 may comprise a 4G antenna. In some embodiments, the first antenna comprises a LoRa antenna. In one example, a gateway device comprises three or more antennas, including at least one LoRa antenna, at least one 4G/LTE antenna, and at least one GNSS antenna. Example LoRaWAN gateways include the Conduit IP67 200 Series (MTCDTIP2-LNA3-B11UKP-LIM) made by MultiTech.

The gateway device 300 further comprises a connection to the at least one server. In the illustrated embodiment, the gateway device 300 comprises second antenna 312. The second antenna 312 may be configured to transmit and/or receive communications from at least one server. In some embodiments, the second antenna 312 comprises a Starlink antenna. In some embodiments, communication between the gateway device 300 and the at least one server may be over cellular connection (e.g., 4G-LTE provided by Verizon or AT&T for example). In some embodiments, communication between the gateway device 300 and the at least one server may be via an Ethernet connection via an Ethernet port. In some embodiments, communication between the gateway device 300 and the at least one server may be over WiFi or WiMAX (e.g., via an Ethernet to WiFi bridge).

In the illustrated embodiment of FIG. 3, the first and second antennas 310-312 are external to enclosure 306. In some embodiments, one or more of the first and second antennas 310-312 are disposed within the enclosure 306.

The gateway device 300 further comprises a router 314. The router 314 is coupled to the second antenna 312. In some embodiments, the router 314 comprises a star link router. The router 314 may be configured to provide an Ethernet connection to a Power-over-Ethernet (POE) injector 316, as shown in FIG. 3. The POE injector may provide Ethernet to the LoRaWAN gateway 308, as shown in FIG. 3.

The gateway device 300 further comprises a solar panel 322. The solar panel 322 is configured to capture solar energy that can be used to power one or more components of the gateway device 300. In some embodiments, the solar panel 322 comprises a 50 W solar panel. As described herein, the gateway device 300 may be configured to communicate directly with each of the one or more communication node devices $400_1$-$400_n$. As in FIG. 2B, each of the communication node devices $400_1$-$400_n$ are coupled to a respective one of control systems $112_1$-$112_n$ As the gateway device 300 communicates with each of the one or more node devices $400_1$-$400_n$, the gateway device 300 may always be powered on in order to facilitate that communication. The gateway device 300 therefore may consume a relatively large amount of energy due to its operation requirements.

The gateway device 300 comprises a solar charger 320. The solar charger 320 is coupled to the solar panel 322. The solar panel 322 provides captured solar energy to the solar charger 320 which is coupled to a battery bank 306 for storing captured solar energy.

The gateway device 300 may further comprise an auxiliary power source 324. The auxiliary power source 324 may be configured to provide additional power to the gateway device 300 in the event that the battery bank 318 cannot provide sufficient power to power the gateway device 300. Accordingly, the auxiliary power source 324 may be coupled to the battery bank 318 and/or one or more other components of the gateway device 300 that require power.

In some embodiments, the gateway device 300 may comprise additional electronics. For example, the gateway device 300 may comprise and/or be coupled to a device which comprises at least one controller configured to perform control logic and/or communication logic. The additional electronics may include a central processing unit. The additional electronics may comprise a power source for the gateway device 300, may provide charging for a power source for the gateway device 300, and/or may provide monitoring of a power source for the gateway device 300 (e.g., performing monitoring of a state of the power source). The power source for the gateway device may be a single point of failure for the gateway device 300. Accordingly, it is beneficial to provide monitoring of a state of the power source. In some embodiments, the additional electronics comprise a positioning system, such as a global navigation satellite system (GNSS).

The gateway device 300 may further comprise a junction box configured to convert a battery voltage. The junction box may be powered via an Ethernet port of the gateway device 300. The junction box may be sealed (e.g., hermetically sealed).

In some embodiments, the gateway device 300 may be a freestanding device. In other embodiments, the gateway device 300 may be coupled to an existing component of a gas extraction system, such as a control system 112 described herein. For example, in some embodiments, the gateway device 300 is coupled to a sensor device configured to measure greenhouse gas emissions as described in U.S. Patent Application Publication No. US2022/0176422, entitled "GREENHOUSE GAS EMISSIONS CONTROL" filed Dec. 2, 2021 incorporated herein by reference.

Figure 4:
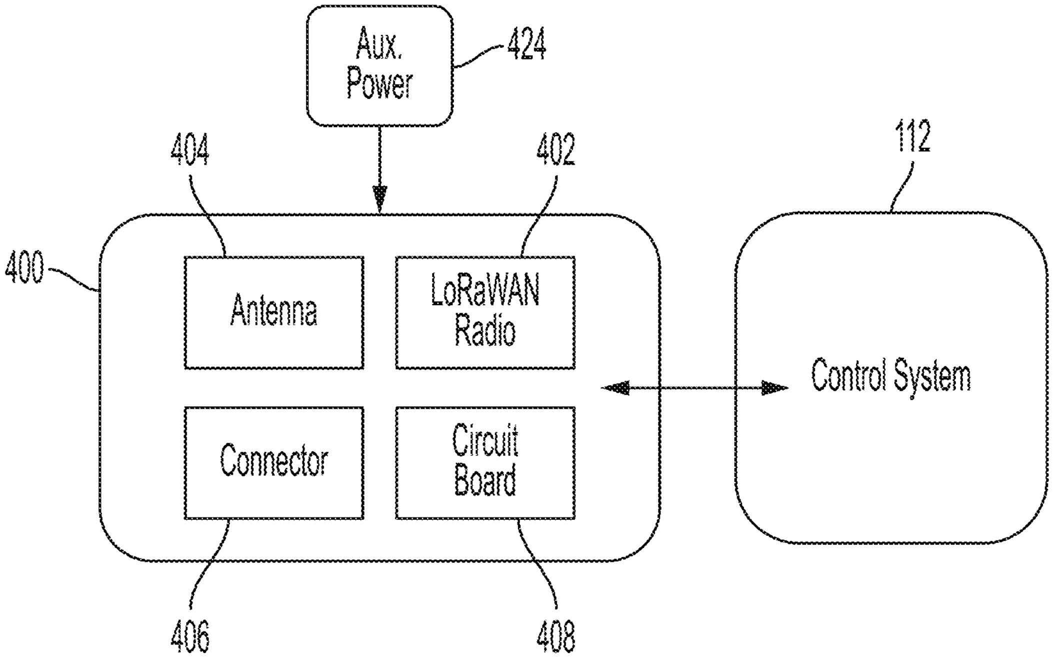
FIG. 4 is a schematic diagram of an example communication node device, in accordance with some embodiments of the technology described herein.

FIG. 4 is a schematic diagram of an example communication node device 400, in accordance with some embodiments of the technology described herein. As described herein, the communication system 200 may comprise one or more communication node devices that communicate directly with the gateway device 300. Accordingly, the communication node devices described herein need not function as repeaters for neighboring devices, but rather need only facilitate their own connection with the gateway device 300.

The communication node device 400 may be configured to communicate information regarding operation of a gas extraction system to the at least one server via the gateway device. In some embodiments, the information comprises sensor measurements, such as sensor measurements of one or more landfill gas characteristics. Therefore, each communication node device 400 may be coupled to a control system 112 described herein, so that the communication node device 400 can communicate one or more measurements obtained by sensor(s) of the control system 112 to the at least one server via the gateway device 300.

As shown in FIG. 4, the node device 400 comprises a LoRaWAN radio 402. As described herein, each communication node device 400 is configured to communicate with the gateway device 300 according to an LPWAN protocol. Each communication node device includes a radio for enabling communication with the gateway device according to the selected LPWAN protocol. In some embodiments, the selected LPWAN protocol is LoRaWAN. Accordingly, the radio of the communication node device 400 may be a LoRaWAN radio, as shown in the illustrated embodiment of FIG. 4. The LoRaWAN radio 402 is a radio module that facilitates communication to the gateway device 300 (e.g., between the LoRaWAN radio of the communication node device 400 and the LoRaWAN gateway 310 of the gateway device 308). An example LoRaWAN radio 402 is the xDot (MTXDOT-NA1-A01) made by MultiTech.

The communication node device 400 further comprises an antenna 404. The antenna 404 transmits and receives information from the gateway device 300. The communication node device 400 and/or the LoRaWAN radio 402 specifically may comprise a connector 406 for coupling the antenna 404 to the communication node device 404. In the illustrated embodiment, the antenna 404 is internal to an enclosure of the communication node device 400 described herein. In other embodiments, the antenna 404 may be external to the enclosure. In some embodiments, the communication node device 400 may comprise multiple antennas which may be internal and/or external to the enclosure of the communication node device 400. In some embodiments, the antenna 404 may be an adhesive antenna configured to be adhered to the communication node device 400. In some embodiments, the antenna 404 may be a chip antenna. In some embodiments, the antenna 404 may be a panel-mounted antenna.

In some embodiments, the communication node device 400 may be retrofit to an existing component of a gas extraction system. For example, as shown in the illustrated embodiment of FIG. 4, the communication node device is coupled to a control system 112 described herein. The communication node device 400 may include circuit board 408 for coupling to the control system 112. For example, the circuit board 408 may be an adapter board configured to connect to a circuit board of the control system 112. Connection of the communication node device 400 to the control system 112 via circuit board 408 allows the LoRaWAN radio 402 to be integrated into a main logic board of the control system 112. In this way, sensor data obtained by the control system 112 (e.g., with the one or more sensors of the control system 112 described herein) may be communicated to the gateway device 300 using the LoRaWAN radio 402 of the communication node device 400.

Connection of the communication node device 400 to the control system 112 may be performed as follows. The LoRaWAN radio requires five signals: 3.3V, GND, TX, RX, and optionally, RESET. The circuit board 408 may provide the signal connections to the circuitry of the control system 112, specifically to the signals 3.3V, GND, Debug RX, Debug TX, and Bootloader, respectively.

The communication node device 400 may further comprise an auxiliary power source 424. The auxiliary power source 424 may be configured to provide additional power to the communication node device 400 in the event that a main power source of the node device 400 cannot provide sufficient power to power the node device 400.

One or more of the components of the communication node device 400 may be disposed in an enclosure. In the illustrated embodiment, the LoRaWAN radio 402, the antenna 404, connector 406, and circuit board 408 are disposed within an enclosure. However, in other embodiments, one or more of the components of node device 400 may be disposed outside of the enclosure, or inside of a separate enclosure. The enclosure of the communication node device 400 may be weather resistant, for example, designed to withstand high and/or low temperatures, wind, and/or rain. In some embodiments, the enclosure of the communication node device 400 may comprise insulation and/or other heat retaining features.

The communication node devices may be positioned throughout the landfill. As described herein, the communication node devices may be coupled to existing devices (e.g., control systems 112) of a gas extraction system. In some embodiments, the communication node devices may be evenly spaced throughout the landfill. In some embodiments, the communication node devices may be placed approximately every 100-200 feet throughout the landfill.

As described herein, the gateway device 300 is configured to communicate information to and/or from an external device, such as at least one server. For example, the one or more communication node devices may provide upstream information (e.g., sensor data) to the at least one server, via the gateway device. The at least one server may provide downstream information (e.g., firmware updates, operating parameters, valve adjustments) to one or more of the communication node devices, via the gateway device.

In some embodiments, the at least one server comprises a single server. In some embodiments, the at least one server comprises multiple servers. The multiple servers may be configured to communicate with each other. The multiple servers may include a Network Server, an Application Server, and/or a message queueing (e.g., MQTT) server. The multiple servers may work together to facilitate communication with the gateway device 300. In some embodiments, a first one of the multiple servers may receive a message from the gateway device and may transmit the received message to one or more other servers. In some embodiments, a first one of the multiple servers may transmit the message from the gateway device. The multiple servers may be housed within a single device such as a single computer. In some embodiments, one or more of the multiple servers may be housed on separate devices.

In some embodiments, the at least one server stores the upstream information from the one or more node devices (e.g., in a database such as a cloud database). In some embodiments, the at least one server performs processing of the upstream information from the one or more node devices. For example, the at least one server may be configured to determine whether and/or how to adjust a flow rate of landfill gas being extracted from the landfill based on sensor data communicated by one or more node devices. The at least one server may transmit instructions regarding an adjustment to the flow rate of landfill gas being extracted from the landfill to one or more of the node devices. In some embodiments, the at least one server determines whether to transmit an alert based on the sensor data. In some embodiments, the at least one server outputs an indication whether extracted landfill gas is in compliance with one or more local, state, and/or federal requirements based on the sensor data.

Figure 5:
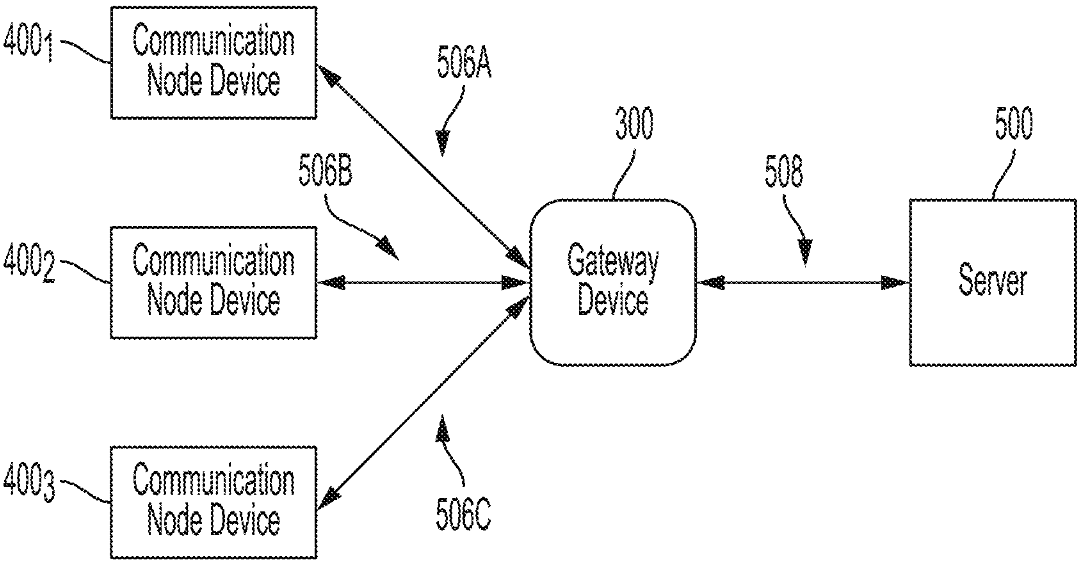
FIG. 5 is a schematic diagram illustrating an example configuration for a communication system for transmitting information using a low power wide area networking protocol configured to operate in a landfill environment, in accordance with some embodiments of the technology described herein.

FIG. 5 is a schematic diagram illustrating an example configuration for a communication system for transmitting information using a low power wide area networking protocol configured to operate in a landfill environment, in accordance with some embodiments of the technology described herein. FIG. 5 illustrates the flow of information in the communication system 200.

As described herein, each communication node device $400_1$-$400_3$ communicates directed with a gateway device 300. As shown in FIG. 5, the respective communication node devices $400_1$-$400_3$ are configured to transmit signals (e.g., information comprising sensor measurements) to the gateway device 300 over communication pathways 506A-506C which subsequently transmits such information to the at least one server 500 over communication pathway 508. The communication node devices $400_1$-$400_3$ are configured to receive signals (e.g., information comprising commands) from the gateway device 400 over communication pathways 506A-506C sent from the at least one server 500 over communication pathway 508 to the gateway device 400.

The communication pathways 506A-506C represent pathways for communication over an LPWAN. In some embodiments, communication via such pathways is not continuous. For example, a communication over some types of LPWAN protocols is unidirectional (e.g., over a LoRaWAN protocol). In such protocols, downstream communication over the LPWAN occurs via a separate communication relative to the upstream communication. In some types of protocols, such as Class B and Class C LoRaWAN protocols, a downstream message can be transmitted from the gateway device to a communication node device on its own without first receiving the upstream message. These techniques allow for transmitting commands to a communication node device, such as a command to adjust a flow rate of landfill gas extracted from the landfill, at any time and does not require the gateway device to wait to receive an upstream message prior to transmitting a downstream message.

The communication pathway 508 between the gateway device 300 and the at least one server 500 may be via a connection such as cellular, satellite (e.g., Starlink), Ethernet, WiFi, WiMAX, or any other suitable connection. The communication pathway may be implemented over a local area network (LAN), a wide area network (WAN) such as a LPWAN (e.g., LoRaWAN), a cloud network, a global area network (GAN), and/or a virtual private network (VPN).

As described herein, the gateway device 300 may have relatively simple control logic, in some embodiments. For example, in some embodiments, the gateway device 300 is configured to relay information between the at least one server and multiple communication node devices without modifying the information. In some embodiments, the gateway device 300 may repackage the information transmitted between the multiple communication node devices and the at least one server. For example, the communication pathways 506A-506C are over an LPWAN, while the communication pathway 508 may be over a different protocol. The gateway device 300 may be configured to repackage information transmitted between the at least one server and multiple communication node devices to comply with the particular protocol of a particular communication pathway.

Figure 6:
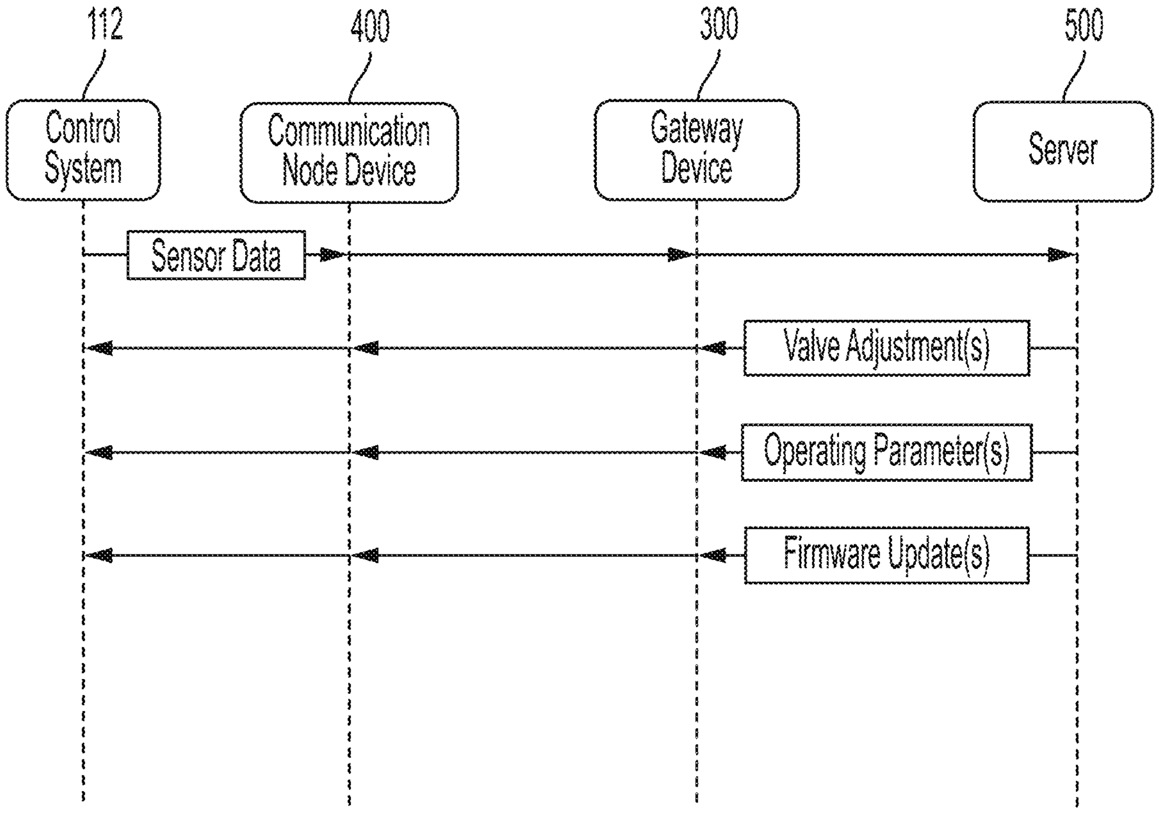
FIG. 6 is a schematic diagram illustrating communications between components of the communication system of FIG. 5, in accordance with some embodiments of the technology described herein.

FIG. 6 is a schematic diagram illustrating communications between components of the communication system of FIG. 5, in accordance with some embodiments of the technology described herein.

As shown in FIG. 6, upstream data includes sensor data originating from the control system 112. For example, communication node device 400 receives sensor data from control system 112. The communication node device transmits the sensor data to the gateway device 300. The gateway device transmits the sensor data to the at least one server. As described herein, the at least one server may perform an action based on the sensor data.

The sensor data comprises one or more measurements obtained from one or more sensors of the control system 112. In some embodiments, the sensor data comprises one or more measurements of a landfill gas characteristic (e.g., a value of a characteristic of extracted landfill gas). For example, the sensor data may include one or more measurements of a gas concentration (e.g., a constituent gas in extracted landfill gas) such as methane, oxygen, carbon dioxide, nitrogen, hydrogen sulfide, and/or balance gas. In some embodiments, the sensor data may include one or more measurements of gas temperature. In some embodiments, the sensor data may include one or more measurements of pressure (e.g., applied pressure, available pressure, barometric pressure). In some embodiments, the sensor data may comprise one or more measurements of a flow rate at which landfill gas is being extracted from the landfill. In some embodiments, the sensor data may include one or more measurements of a characteristic of ambient air external to the control system.

In some embodiments, the control system may be configured to measure multiple characteristics (e.g., landfill gas characteristics, characteristics of the gas extraction system and/or gas extraction process, characteristics of ambient air external to the control system). Each characteristic may be measured at least once per hour (e.g., once an hour, multiple times an hour). Accordingly, the sensor data may comprise multiple measurements of multiple characteristics each hour.

As shown in FIG. 6, the at least one server 500 transmits information to the control system 112. For example, the at least one server 500 transmits information to the gateway device 300 which transmits the information to the communication node device 400 which transmits the information to the control system. In some embodiments, the information comprises a valve adjustment. For example, the information may comprise a command to the control system to adjust a valve disposed in well piping to change the flow rate of landfill gas being extracted from the landfill (e.g., by adjusting a degree to which the valve is open). The command may comprise a command to increase the flow rate (e.g., by opening the valve to a greater degree) and/or a command to decrease the flow rate (e.g., by closing the valve to a greater degree). The instruction to adjust the flow rate of landfill gas being extracted from the landfill may be based on the sensor data, as described herein.

In some embodiments, the at least one server 500 transmits operating parameter(s) to the control system 112. For example, the operating parameter(s) may include an instruction to change how the control system 112 and/or the communication node device operates. For example, the operating parameter may comprise a sampling frequency indicating a frequency and/or timing at which a particular characteristic should be measured. The control system 112 may adjust how it operates its sensors based on the updated operating parameter.

In some embodiments, the at least one server 500 transmits a firmware upgrade to the control system 112. The firmware upgrade may be applied to the control system 112 and/or the communication node device 400. In some embodiments, firmware updates may be applied manually directly to the component to be upgraded.

Figure 7:
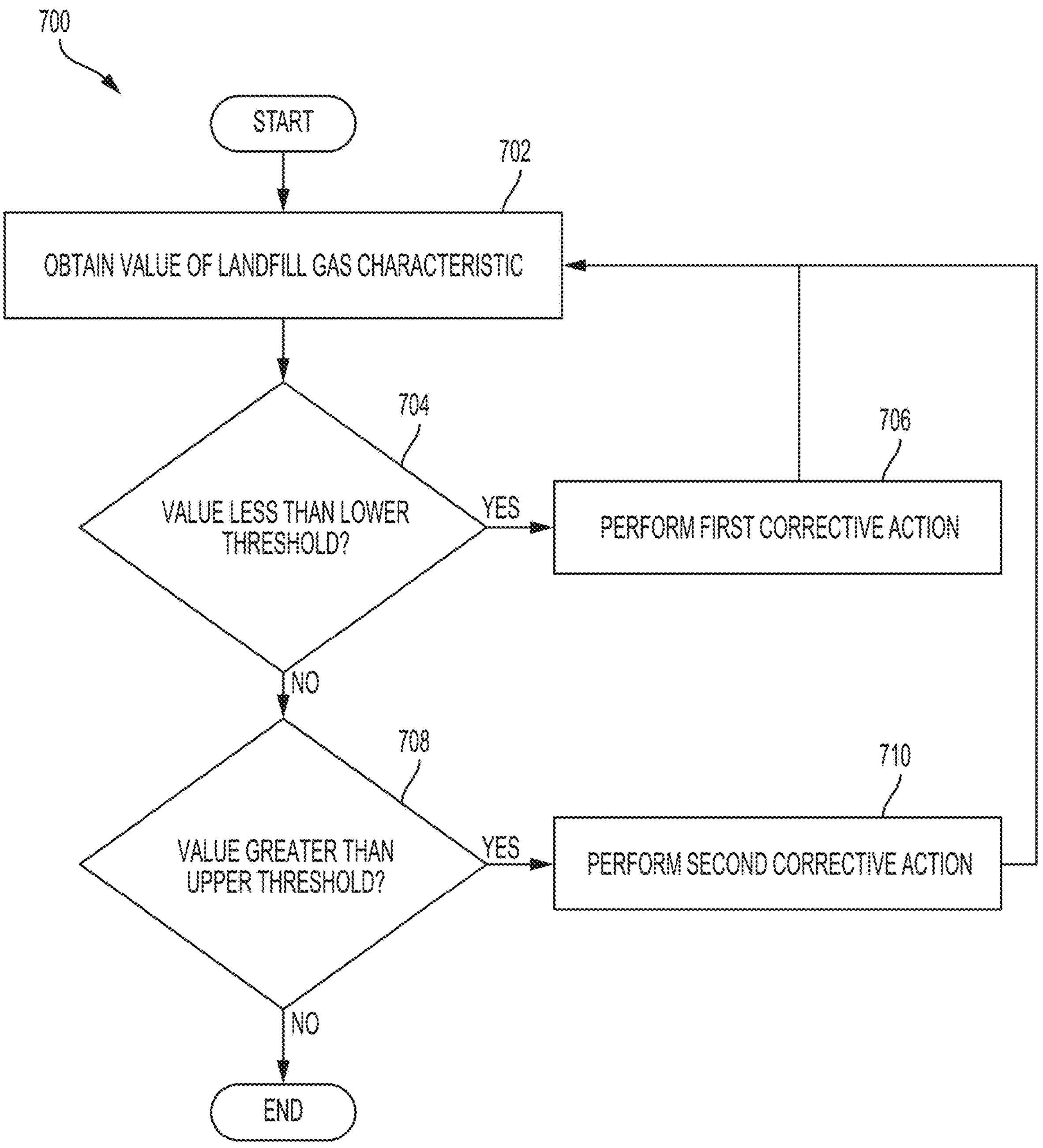
FIG. 7 is a flowchart of an illustrative process for controlling extraction of landfill gas through a gas extraction system, in accordance with some embodiments of the technology described herein.

As described herein, a flow rate at which landfill gas is extracted from the landfill may be adjusted based on the sensor data sent by the control system. FIG. 7 is a flowchart of an illustrative process 700 for controlling extraction of landfill gas through a gas extraction system, in accordance with some embodiments of the technology described herein. The illustrative process 700 may be implemented by the communication system described herein.

Process 700 begins at act 702, where a value for a landfill gas characteristic is obtained. For example, the characteristic may be a concentration of a constituent gas in the extracted landfill gas. The measured concentration may be obtained by using one or more sensors configured to sense partial pressure and/or concentration of the constituent gas in the landfill gas being extracted from a landfill. The constituent gas may be methane, oxygen, nitrogen, carbon dioxide, carbon monoxide, hydrogen sulfide, balance gas or any other gas that may be part of gas being extracted from a landfill.

Act 702 may be performed by the control system 112 described herein. Although the illustrative process 700 is shown to obtain a landfill gas characteristic at act 702, it should be understood that process 700 may be used with other obtained measurements, such as the measurements described herein.

Next, process 700 proceeds to decision block 704, where it is determined whether the value obtained at act 702 is less than a lower threshold. For example, the characteristic may be methane concentration of the extracted landfill gas and it may be determined, at decision block 704, whether the measured concentration of methane is less than a first threshold for methane concentration (e.g., less than 30% by volume, less than 35% by volume less than 40% by volume, less than 45% by volume, less than 50% by volume, less than 55% by volume, and/or less than any suitable percentage in the 30-55% range by volume).

Act 704 may be performed by the at least one server 500 described herein. For example, the measurement obtained at act 702 by the control system 112 may be transmitted to the at least one server 500 with the communication system 200 described herein, and the at least one server may use the measurement to determine whether the obtained value is less than the lower threshold.

When it is determined that the value obtained at act 702 is less than the lower threshold, process 700 proceeds, via the YES branch, to act 706, where a first corrective action is performed. The first corrective action may comprise an adjustment to the flow rate of landfill gas extracted from a well. Adjusting the flow rate may comprise adjusting a degree to which a valve of the well is open. For example, decreasing the flow rate may comprise decreasing the degree to which the valve of the well is open. Increasing the flow rate may comprise increasing the degree to which the valve of the well is open.

Act 706 may be performed by the control system 112 in some embodiments. For example, based on the determination made by the at least one server 500 in act 702, a command to adjust the flow rate of landfill gas being extracted from the landfill may be sent to the control system via the communication system 200, and the control system 112 may adjust the flow rate of landfill gas being extracted from the landfill according to the command.

In some embodiments, the corrective action may comprise transmitting an alert. In such embodiments, the at least one server 500 may perform the transmitting the alert at act 706.

On the other hand, when it is determined that the value obtained at act 702 is greater than or equal to the lower threshold, process 700 proceeds, via the NO branch, to decision block 708, where it is determined whether the value obtained at act 702 is greater than an upper threshold. For example, the characteristic may be methane concentration of the extracted landfill gas, and it may be determined, at decision block 708, whether the measured concentration of methane is greater than a second target concentration of methane (e.g., greater than 40% by volume, greater than 45% by volume, greater than 50% by volume, greater than 55% by volume, greater than 60% by volume, greater than 65% by volume, and/or greater than any suitable percentage in the 40-70% range by volume).

Act 708 may be performed by the at least one server 500 described herein. For example, the measurement obtained at act 702 by the control system 112 may be transmitted to the at least one server 500 with the communication system 200 described herein, and the at least one server may use the measurement to determine whether the obtained value is greater than the upper threshold.

When it is determined that the value obtained at act 702 is not greater than the upper threshold, process 700 completes, as value obtained at act 702 is in the target range (between the upper and lower thresholds). The process 700 may be repeated periodically and/or according to a schedule to continue monitoring the characteristic.

On the other hand, when it is determined, at decision block 708, that the value obtained at act 702 is greater than the upper threshold, process 700 proceeds, via the YES branch, to act 710, where a second corrective action is performed. The second corrective action may comprise an adjustment to the flow rate of landfill gas extracted from a well. Adjusting the flow rate may comprise adjusting a degree to which a valve of the well is open. For example, decreasing the flow rate may comprise decreasing the degree to which the valve of the well is open. Increasing the flow rate may comprise increasing the degree to which the valve of the well is open.

Act 710 may be performed by the control system 112 in some embodiments. For example, based on the determination made by the at least one server 500 in act 702, a command to adjust the flow rate of landfill gas being extracted from the landfill may be sent to the control system via the communication system 200, and the control system 112 may adjust the flow rate of landfill gas being extracted from the landfill according to the command. In some embodiments, the corrective action may comprise transmitting an alert. In such embodiments, the at least one server 500 may perform the transmitting the alert at act 710.

As shown in FIG. 7, after completion of either of acts 706 and 708, process 700 returns to act 702, where an updated value of the characteristic may be obtained and another iteration of the process 700 may begin to be performed. Additional details regarding processes for controlling extraction of landfill gas through a gas extraction system are provided in U.S. Patent Application Publication No. 2017/0216891, entitled "DEVICES AND TECHNIQUES RELATING TO LANDFILL GAS EXTRACTION" filed on Nov. 4, 2014, U.S. Patent Application Publication No. 2017/0218730, entitled "DEVICES AND TECHNIQUES RELATING TO LANDFILL GAS EXTRACTION" filed on Apr. 21, 2017, and U.S. Patent Application Publication No. 2020/0101505, entitled "LANDFILL GAS EXTRACTION SYSTEMS AND METHODS" filed on Oct. 1, 2019, each of which are incorporated herein by reference.

As described herein, the inventors have developed techniques for configuring a communication system comprising one or more gateway devices and multiple communication node devices for operation. The techniques provide for positioning the gateway device in an optimal location for carrying out the necessary communications capabilities in the context of landfill gas extraction monitoring and control. The positioning of the gateway device may be evaluated and adjusted based on an evaluation of the quality of LPWAN communications between the gateway device and multiple communication node devices.

Figure 8:
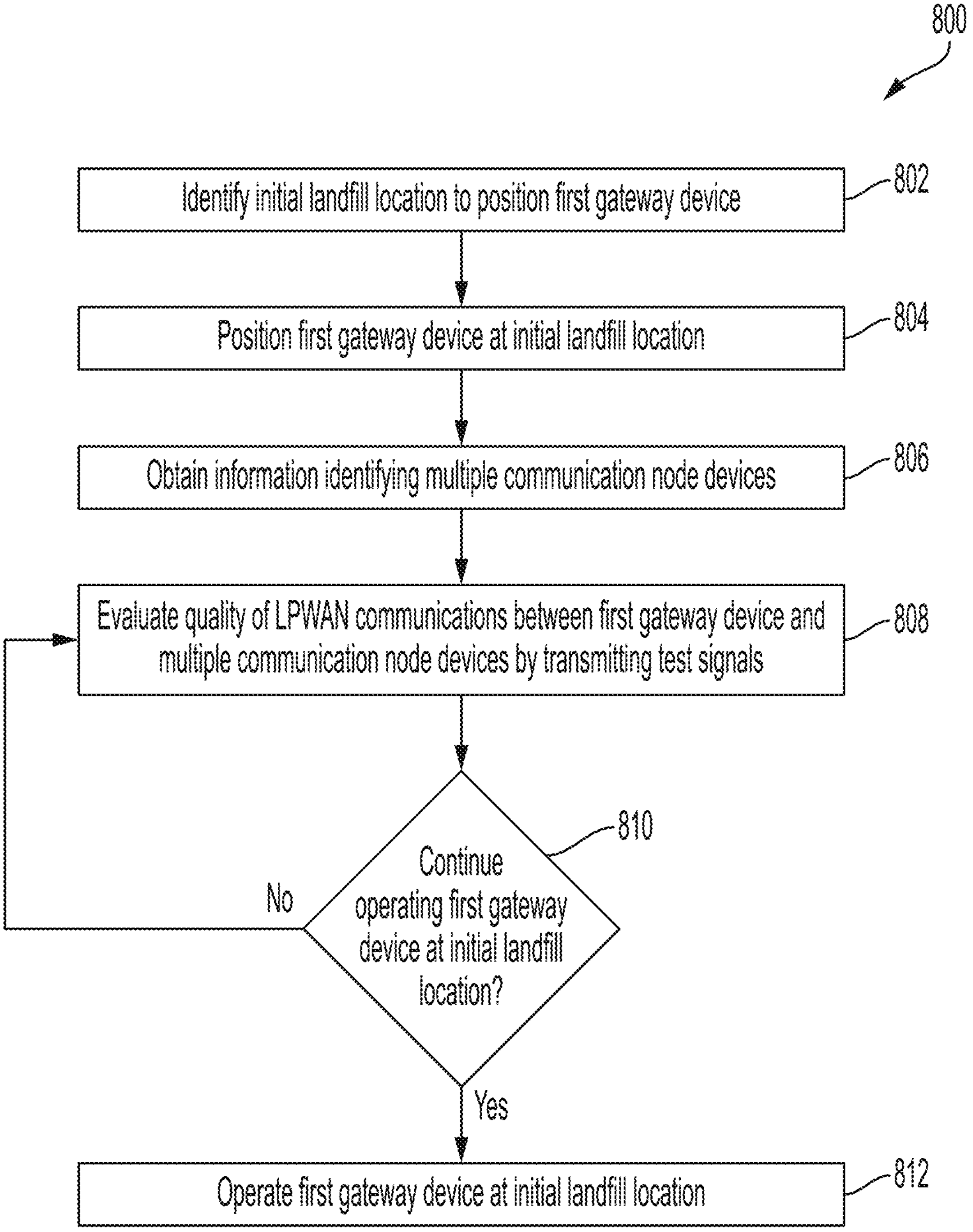
FIG. 8 is flow chart of an illustrative process for configuring a communication system configured to operate in a landfill environment, in accordance with some embodiments of the technology described herein.

FIG. 8 is flow chart of an illustrative process 800 for configuring a communication system configured to operate in a landfill environment, in accordance with some embodiments of the technology described herein. The communication system may comprise a first gateway device and multiple communication node devices. For example, the illustrative process 800 may be used to configure a communication system such as communication system 200 described herein.

Process 800 begins at act 802 where an initial landfill location to position a first gateway device is identified. The initial landfill location may be a default location for positioning a first gateway device, if the default location is deemed available. Accordingly, in some embodiments, identifying the initial landfill location to position a first gateway device may comprise determining whether a default location is available.

Figure 9:
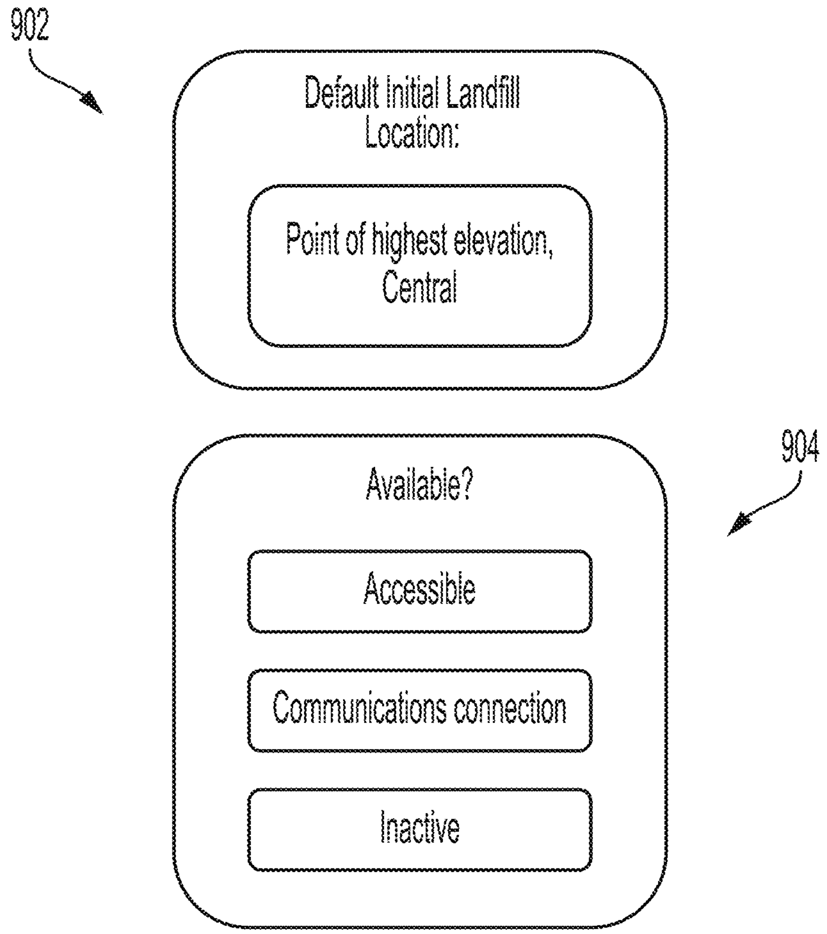
FIG. 9 is a schematic diagram illustrating aspects of a process for identifying an initial landfill location to position a gateway device, in accordance with some embodiments of the technology described herein.

FIG. 9 is a schematic diagram illustrating aspects of a process for identifying an initial landfill location to position a gateway device, in accordance with some embodiments of the technology described herein. As shown in FIG. 9, a first step 902 to determining the initial landfill location to position the first gateway device comprises identifying a default initial landfill location. In some embodiments, the default location is a point in a region of the landfill having a highest elevation. In some embodiments, the default location is at a center of the landfill or within a threshold maximum distance from a center of the region of the landfill.

As shown in FIG. 9, a second step 904 to determining the initial landfill location to position the first gateway device comprises determining whether the identified default location is available. In some embodiments, the default location may be deemed available if it meets one or more criteria. In some embodiments, the location must have a communications connection, such as a cellular connection, and Ethernet connection, a WiFi connection, a WiMax connection, and/or a satellite connection, to be deemed available. In some embodiments, the location must be accessible (e.g., physically accessible by a human operator) to be deemed accessible. In some embodiments, the location must be inactive to be deemed accessible. A location may be deemed inactive if is a location that does not receive new waste added to the landfill. By contrast, a location which receives new waste may be deemed active.

At act 804, the first gateway device is positioned at the initial landfill location identified at act 802. Positioning the first gateway device may include configuring the first gateway device for communication with at least one server, such as by setting up a connection with the at least one server via cellular, satellite, WiFi, Ethernet, WiMAX, or other suitable connection. In some embodiments, positioning the first gateway device at the initial landfill location may comprise physically installing the first gateway device into the ground of the landfill at the initial landfill location.

At act 806, information identifying multiple communication node devices of the communication system is obtained. For example, the information identifying the multiple communication node devices may comprise addresses of the multiple communication node devices. The information identifying the multiple communication node devices may enable the first gateway device to communicate with the multiple communication node devices.

At act 808, the first gateway device is configured to communicate with the multiple communication node devices using the information identifying the multiple communication node devices. In particular, the first gateway device is configured to communicate with the multiple communication node devices using an LPWAN protocol. For example, the LPWAN protocol may comprise a LoRaWAN protocol. The information obtained at act 806 (e.g., the addresses of the multiple communication node devices) is used to configure the first gateway device to communicate with the multiple communication node devices.

At act 810, a quality of LPWAN communications between the first gateway device and the multiple communication node devices is evaluated. Act 810 is performed by transmitting test signals between the first gateway device and individual ones of the multiple communication node devices. In some embodiments, act 810 may include determining whether test signals between the gateway device and the multiple communication nodes can be received at their intended destinations. In some embodiments, act 810 may include determining a strength of the received signals.

Figure 10:
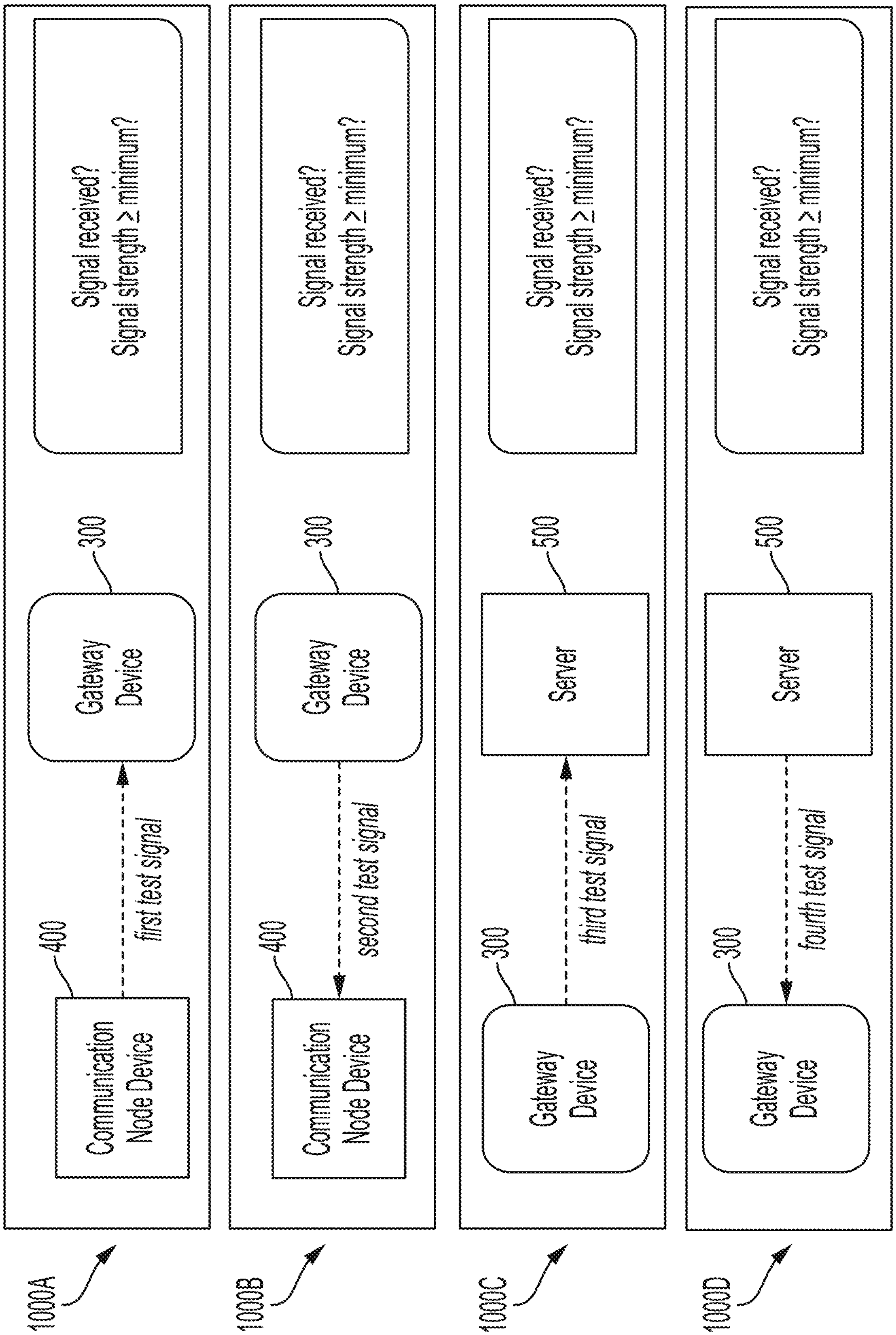
FIG. 10 is a schematic diagram illustrating aspects of a process for evaluating quality of LPWAN communications between a gateway device and multiple communication node devices, in accordance with some embodiments of the technology described herein.

For example, FIG. 10 is a schematic diagram illustrating aspects of a process for evaluating quality of LPWAN communications between a gateway device and multiple communication node devices, in accordance with some embodiments of the technology described herein. As shown in block 1000A in FIG. 10, evaluating a quality of LPWAN communications may include transmitting a first test signal from a communication node device 400 of the multiple communication node devices to the first gateway device 300. It may be determined whether the first test signal was received by the gateway device 300. It may be determined whether a signal strength of the received signal is greater than or equal to a minimum signal strength. Block 1000A may be performed for each communication node device.

Transmitting the first test signal may comprise encoding, with a first communication node device of the multiple communication node devices, one or more measurements of one or more landfill gas characteristics of landfill gas being extracted from a first well of a plurality of wells in the landfill in a first set of one or more packets in accordance with the particular LPWAN protocol and transmitting the first set of one or more packets from the first communication node device to the first gateway device.

As shown in block 1000B, evaluating the quality of LPWAN communications between the gateway device and the multiple communication node devices may include transmitting a second test signal from the first gateway device 300 to the communication node device 400. It may be determined whether the second test signal was received by the communication node device 400. It may be determined whether a signal strength of the received signal is greater than or equal to a minimum signal strength. Block 1000B may be performed for each communication node device.

Transmitting the second test signal may comprise transmitting a second set of packets from the first gateway device to the first communication node device. The second set of packets may comprise a command from the at least one server to adjust a flow rate of landfill gas being extracted from the landfill. Transmitting the second test signal may further comprise decoding, using the first communication node device, the at least some information in the second set of packets to obtain the instruction to adjust the flow rate of landfill gas being extracted from the first well.

In some embodiments, the quality of the LPWAN communications may be deemed sufficient when the first test signal is received by the communication node device and the second test signal is received by the first gateway device. In some embodiments, the quality of LPWAN communications may be deemed sufficient when the first and second test signals are received by the gateway device and the communication node device respectively and signal strengths of the first and second test signals are greater than or equal to a minimum signal strength.

As shown in block 1000C, the process 800 may further include transmitting a third test signal from the first gateway device 300 to the at least one server 500. It may be determined whether the third test signal was received by the first gateway device 300. It may be determined whether a signal strength of the received signal is greater than or equal to a minimum signal strength.

In some embodiments, transmitting the third test signal may comprise transmitting the first set of one or more packets from the first gateway device to at least one server. In some embodiments, transmitting the third test signal further comprises decoding, using the at least one server, the first set of one or more packets to obtain the set of one or more measurements of the one or more landfill gas characteristics.

As shown in block 1000D, the process 800 may include transmitting a fourth test signal from the at least one server to the first gateway device 300. It may be determined whether the fourth test signal was received by the first gateway device 300. It may be determined whether a signal strength of the received signal is greater than or equal to a minimum signal strength.

In some embodiments, transmitting the fourth test signal may comprise receiving, with the first gateway device, a second set of packets from at least one server, the second set of packets being encoded from a command from the at least one server to adjust a flow rate of landfill gas being extracted from a first well of a plurality of wells in the landfill.

In some embodiments, the quality of the LPWAN communications may be deemed sufficient when the third test signal is received by the at least one server and the fourth test signal is received by the first gateway device. In some embodiments, the quality of LPWAN communications may be deemed sufficient when the third and fourth signals are received by the at least one server and the gateway device respectively and signal strengths of the third and fourth signals are greater than or equal to a minimum signal strength.

At act 810, it is determined whether to continue operating the first gateway device at the initial landfill location. Act 810 is performed based on the results of the evaluating in act 808. For example, it may be determined to continue operating the first gateway device at the initial landfill location when the quality of LPWAN communications is deemed sufficient, according to the techniques described herein. In particular, it may be determined to continue operating the first gateway device at the initial landfill location when test signals transmitted between the first gateway device and the multiple communication node devices are received and have signal strengths greater than or equal to a minimum threshold signal strength.

When it is determined, at act 810, to continue operating the first gateway device at the initial landfill location, the process 800 proceeds through the YES branch to act 812 where the first gateway device is operated at the initial landfill location. If, on the other hand, it is determined, at act 810, not to continue operating the first gateway device at the initial landfill location, the process 800 returns through the no branch to act 808 where the quality of LPWAN communications between the first gateway device and the multiple communication node devices is evaluated with the first gateway device positioned at a different landfill location. The process 800 loops through acts 808-810 until it is determined that a particular one of the one or more other landfill locations provides sufficient quality LPWAN communications between the first gateway device and the multiple communication node devices.

In some embodiments, the method further comprises installing at least one second gateway device of the one or more gateway devices in the region of the landfill in response to determining not to continue operating the first gateway at the initial landfill location, In some embodiments, process 800 further includes installing the multiple communication node devices at a plurality of locations within a region comprising the landfill. Installing the multiple communication node devices may include configuring the multiple communication node devices for communication with the first gateway device over the LPWAN (e.g., by providing the multiple communication node devices with an address of the first gateway device). In some embodiments, installing the multiple communication node devices includes physically installing the multiple communication node devices into the ground of the landfill. In some embodiments, the multiple communication node devices may be coupled to respective control systems. Accordingly, the process may include coupling the multiple communication node devices to respective control systems.

In some embodiments, respective ones of the multiple communication node devices may be configured to communicate according to different LPWAN protocols. Installing the multiple communication devices may comprise selecting a type of LPWAN protocol for each communication node device of the multiple communication node devices from at least two different types of LPWAN protocols. Selecting the type of LPWAN protocol for each communication node device may be based on whether the communication node device is coupled to a control system configured to adjust a flow rate of landfill gas being extracted from the landfill. For example, communication node devices coupled to control systems which adjust landfill gas extraction flow rate by controlling a valve disposed in well piping may be configured to communicate with the first gateway device according to a different LPWAN protocol than communication node devices coupled to control systems which only monitor characteristics of extracted landfill gas, but which do not adjust landfill gas extraction flow rates.

Figure 11:
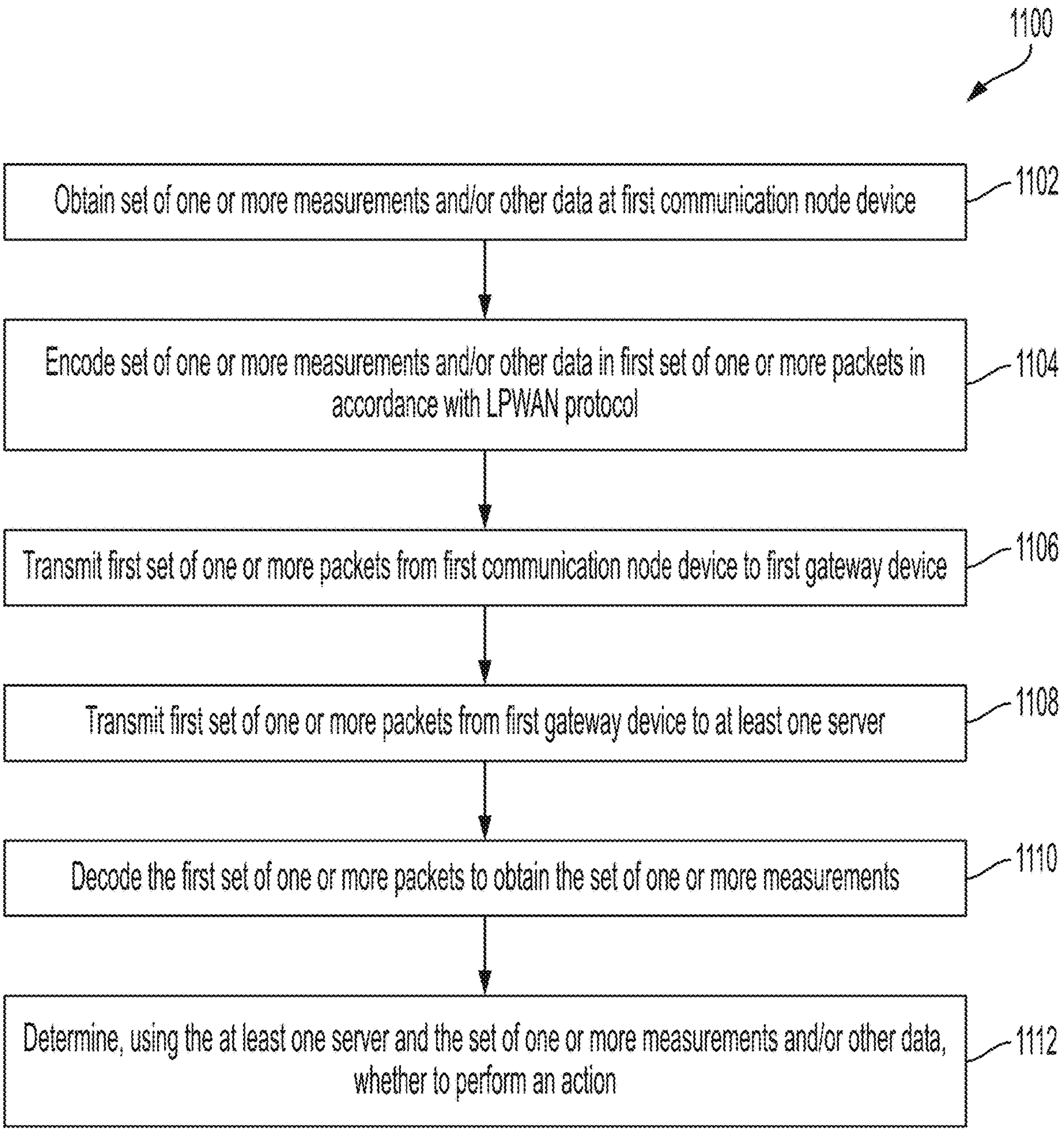
FIG. 11 is a flowchart of an illustrative process for monitoring extraction of landfill gas from a landfill using a communication system configured to transmit information using an LPWAN protocol, in accordance with some embodiments of the technology described herein.

As described herein, although LPWAN protocols are known, adopting this protocol for use in communicating information in a landfill gas extraction environment involves a number of challenges, including the small packet sizes for messages transmitted over an LPWAN protocol. The inventors have addressed these challenges with techniques for transmitting information using an LPWAN protocol that include segmenting information transmitted between the communication node devices and the at least one server into smaller packets and reassembling the packets upon receipt. FIG. 11 is a flowchart of an illustrative process 1100 for monitoring extraction of landfill gas from a landfill using a communication system configured to transmit information using an LPWAN protocol, in accordance with some embodiments of the technology described herein.

Process 1100 begins at act 1102 where a set of one or more measurements are obtained and/or other data at a first communication node device. For example, the first communication node device may be one of multiple communication node devices in a communication system comprising the multiple communication node devices and one or more gateway devices. The first communication node device may be coupled to a first control system configured to monitor and/or control extraction of landfill gas from a first well of a plurality of wells in a landfill. Accordingly, the set of one or more measurements obtained at act 1102 may comprise one or more measurements obtained by one or more sensors of the control system (e.g., sensor data, as described herein). The one or more measurements may be of a landfill gas characteristic of landfill gas extracted from the first well, as described herein (e.g., a concentration of a gas such as methane, oxygen, carbon dioxide, nitrogen, hydrogen sulfide, etc., and/or a gas temperature). In some embodiments, the measurement may be of pressure inside and/or outside of the control system. In some embodiments, the one or more measurements may be of a characteristic of ambient air external to the control system.

In some embodiments, other data is obtained at act 1102. For example, the other data may comprise device identification codes such as an identification code of the control system and/or communication node device, brand, model, and/or version information regarding one or more components of the control system such as the one or more sensors, serial numbers of one or more components of the control system and/or communication node device, diagnostic codes, error codes, flags, timestamps, commands, requests, response, acknowledgements, records of events that occurred, or any other information that is desired to communicate from the control system to the at least one server.

At act 1104, the set of one or more measurements and/or other data are encoded in a first set of one or more packets in accordance with an LPWAN protocol. In some embodiments, the LPWAN protocol is LoRaWAN. As described herein, communications transmitted using an LPWAN protocol have a maximum packet size. The maximum packet size may be much smaller than the size of the type of information that needs to be communicated in the context of a landfill gas extraction system. For example, the information transmitted may be measurements of a landfill gas characteristic such as a measurement of a concentration of a constituent gas in landfill gas of a gas stream (e.g., extracted from a well). The information may further include additional information such as diagnostic information and/or high frequency measurements of gas characteristics as they vary over time. Such a measurement may be approximately 4300 bytes.

On the other hand, packet limits for messages transmitted according to an LPWAN protocol may be much smaller (e.g., 242 bytes, 125 bytes, 53 bytes, 11 bytes). Accordingly, in some embodiments, a size of each packet of the first set of one or more packets is greater than or equal to 1 byte and less than or equal to 242 bytes, greater than or equal to 1 byte and less than or equal to 125 bytes, greater than or equal to 1 byte and less than or equal to 53 bytes, or greater than or equal to 1 byte and less than or equal to 11 bytes. Given the large size of the measurement data (e.g., approximately 4300 bytes) and the small size of the message packets in which the measurement data is to be transmitted, the measurement data must be encoded into multiple packets that are later reassembled upon receipt by the at least one server. Accordingly, the communication node device may comprise hardware and/or software configured to encode the set of one or more measurements into the first set of one or more packets in accordance with the particular LPWAN protocol.

The measurement data may only be part of a packet. For example, a message packet formed in accordance with an LPWAN protocol (e.g., a LoRaWAN packet) may include multiple parts. One part of the measurement packet is the payload which contains the actual measurement information. The payload portion then includes three groups of fields: a header defining information about the type of message and its format version, a payload containing the information being transmitted (e.g., the measurement data), and a message integrity code used by a network server to verify that the message originated from the same end device registered within the network server.

The payload field includes a frame header which includes frame options. The size of the frame options varies. The larger the frame options field, the smaller the size of the payload. The frame header may contain information like instructions to switch to a different frequency or data rate. This type of information may not be transmitted in every packet or every message, so a radio of the transmitting device needs to know how many bytes of payload information can be transmitted in each packet at the encoding process.

As described herein, different limits on packet size may be imposed. In some instances, a maximum packet size may depend on available data rate. For example, lower data rates may have longer transmission range, but require smaller packets. As one example, for communications according to a LoRaWAN protocol in the United States, DR0 corresponds to a maximum packet size of 11 bytes, DR1 corresponds to a maximum packet size of 53 bytes, DR2 corresponds to a maximum packet size of 125 bytes and DR3 and DR4 correspond to a maximum packet size of 242 bytes.

The data rate and corresponding packet sizes may depend on the jurisdiction in which the communication system is operating. For example, maximum packet sizes for a particular data rate are currently lower in Europe than in the United States (e.g., for communications according to a LoRaWAN protocol, DR4 allows 242 byes in the United States, but only 222 bytes in Europe). Accordingly, if it is desired to safely transmit information in both jurisdictions (the U.S. and Europe), the maximum packet size that can be used at a particular data rate is the lower of the two jurisdictions.

Figure 12A:
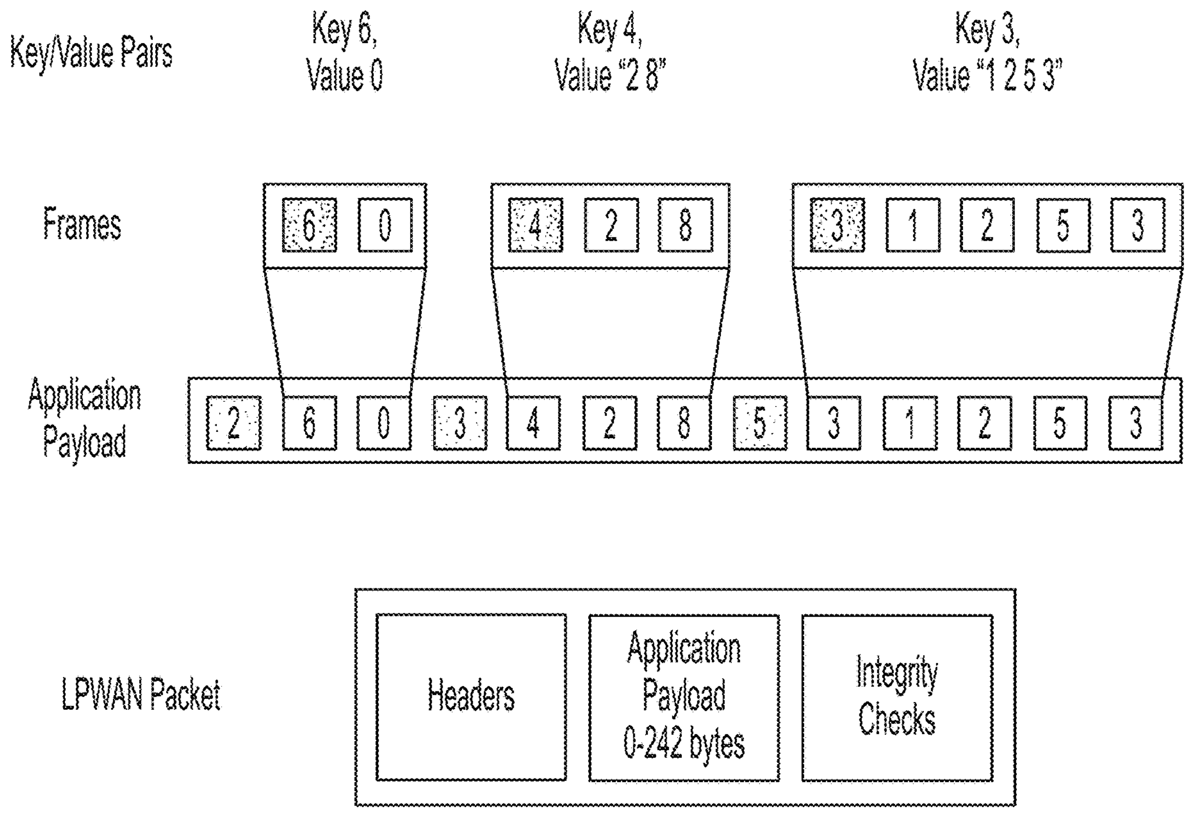
FIG. 12A is an example schematic diagram illustrating aspects of segmenting payload data, in accordance with some embodiments of the technology described herein.

FIG. 12A is an example schematic diagram illustrating aspects of segmenting payload data, in accordance with some embodiments of the technology described herein. As shown in FIG. 12A, an LPWAN packet comprises headers, an application payload, and integrity checks. In the example LPWAN packet of FIG. 12A, a maximum packet size is 242 bytes, and the payload which contains the measurement data, comprises between 0 and 242 bytes of the packet.

In the application payload, each byte could represent values as large as 255. For simplicity, only values 0-9 are shown in the example packet of FIG. 12A. The Application Payload encodes a sequence of variable-length frames, in which the first byte (highlighted in yellow—2, 3, and 5 of the middle row labeled "Application Payload" in FIG. 12A) indicates the length of the first frame. The next N bytes are the contents of the first frame, and subsequent bytes define the length and contents of the remaining frames. There is a built-in integrity check here. If one arrives at the end of the payload and there are extra bytes remaining, then it can be known that the payload has been corrupted.

Turning to the top row, the frames are then examined. The first one or more bytes of a frame (highlighted in blue—6, 4, and 3 of the top row labeled "Frames" in FIG. 12A) serves as a key that indicates the type of data to follow. The remaining bytes in the frame represent the data/value of the frame. For example, if transmitter and receiver agree that Key 6 represents ambient temperature, the frame "6 0" could indicate a recent temperature measurement of zero degrees.

Subsequent to encoding the first set of one or more measurements in the first set of one or more packets, the process 1100 proceeds to act 1106, wherein the first set of one or more packets are transmitted from the first communication node device to a first gateway device of the one or more gateway devices of the communication system. Transmitting the first set of one or more packets from the first communication node device to the first gateway device is performed using the particular LPWAN protocol. For example, as described herein, the first communication node device comprises a radio (e.g., LoRaWAN radio 402) which can communicate over an LPWAN with a radio of the first gateway device (e.g., LoRaWAN gateway 308) based on knowing the address of the first gateway device. The first gateway device may be configured to "listen to" (e.g., receive messages from) up to eight communication node devices at a time.

As one example, a set of one or more packets transmitted from a communication node device of multiple communication node devices of a communication system to a first gateway device of one or more gateway devices of the communication system using a LoRaWAN protocol may be transmitted using the following parameters. A bandwidth of 125 kHz, a data rate in one of DR0-DR3 (which may be automatically selected by the network via an adaptive data rate scheme), and a coding rate of 4:5 (which is standard for LoRaWAN) may be used. These parameters result in the data rates shown in Table 1.

TABLE 1

Example Data Rates for First Set of Operating Parameters

| Data Rate | Spreading Factor | bits/sec | bytes/sec |
|---|---|---|---|
| DR0 | SF10 | 977 | 122.1 |
| DR1 | SF9 | 1758 | 219.7 |
| DR2 | SF8 | 3125 | 390.6 |
| DR3 | SF7 | 5469 | 683.6 |

It is noted that the above rates listed in Table 1 are for "raw" transmission rates for a single device. They do not consider idle time, collisions, acknowledgements, retransmissions, or the overhead added by the LoRaWAN preamble and protocol headers. All of these factors will reduce the overall amount of "payload" data that can be transmitted in each packet.

In some embodiments, prior to performing the transmitting at act 1106, the set of one or more measurements may be compressed. For example, a compression algorithm such as run-length encoding (RLE) or Lempel-Ziv-Storer-Szymanski (LZSS) may be applied to the first set of one or more measurements to reduce the size of the original message so that when it is encoded at act 1104 into the first set of one or more packets, fewer packets need to be transmitted at act 1106.

At act 1108, the first set of one or more packets are transmitted by the first gateway device to the at least one server. As described herein, the first gateway device may be configured to communicate with the at least one server via a connection such as a cellular, satellite, WiFi, WiMax, Ethernet, or any other suitable connection.

In some embodiments, the first gateway device forwards the first set of one or more packets to the at least one server without modifying the first set of one or more packets. In some embodiments, the first gateway device modifies the first set of one or more packets to make the first set of one or more packets compatible for transmission according to the connection between the first gateway device and the at least one server (e.g., via one of cellular, satellite, WiFi, WiMax, or Ethernet connection). In some embodiments, the first set of one or more packets are encrypted. In such instances, the first gateway device may not be capable of modifying the contents of the respective packets. Rather, the first gateway device may be configured to add packaging to the respective packets to make the packets compatible for transmission by the first gateway device.

At act 1110, the first set of one or more packets transmitted to the at least one server are decoded by the at least one server to obtain the set of one or more measurements and/or other data. Decoding the first set of one or more packets may include reassembling the payload data contained in the first set of one or more packets to obtain the one or more measurements and/or other data obtained at act 1102. The decoding may be based on the structure of the packets as described with respect to FIG. 12A. Accordingly, the at least one server may include hardware and/or software for decoding the first set of one or more packets.

As described herein, in some embodiments, prior to performing the transmitting at act 1106, the set of one or more measurements may be compressed. For example, a compression algorithm such as run-length encoding (RLE) or Lempel-Ziv-Storer-Szymanski (LZSS) may be applied to the first set of one or more measurements to reduce the size of the original message so that when it is encoded at act 1104 into the first set of one or more packets, fewer packets need to be transmitted at act 1106. In some embodiments, at act 1110, the server may perform decompression of the decoded information.

At act 1112, it is determined, using the at least one server and the set of one or more measurements and/or other data, whether to perform an action. For example, the determining may comprise comparing the set of one or more measurements to at least one threshold to determine if the set of one or more measurements is greater than, equal to, or less than the threshold. For example, in some embodiments, an action may be taken if the set of one or more measurements is greater than or equal to an upper threshold and/or less than or equal to a lower threshold. Algorithms including one or more aspects of process 700 may be performed by the at least one server to determine whether to perform an action.

In some embodiments, the action may comprise transmitting an alert indicating that at least one of the landfill gas characteristics is outside of a target range, below a first threshold value, and/or above a second threshold value. In some embodiments, the action may comprise outputting an indication that the landfill gas extracted from the first well is in compliance with one or more local, state, and/or federal requirements. For example, it may be determined that when the set of one or more measurements is within a target range and/or above a lower threshold, less than an upper threshold, and/or equal to a target, that the landfill gas extracted from the first well is in compliance with one or more local, state, and/or federal requirements. The outputting may comprise transmitting the indication to an external device or user. The outputting may comprise storing the indication in memory, such as in at least one non-transitory computer readable storage medium.

Figure 12B:
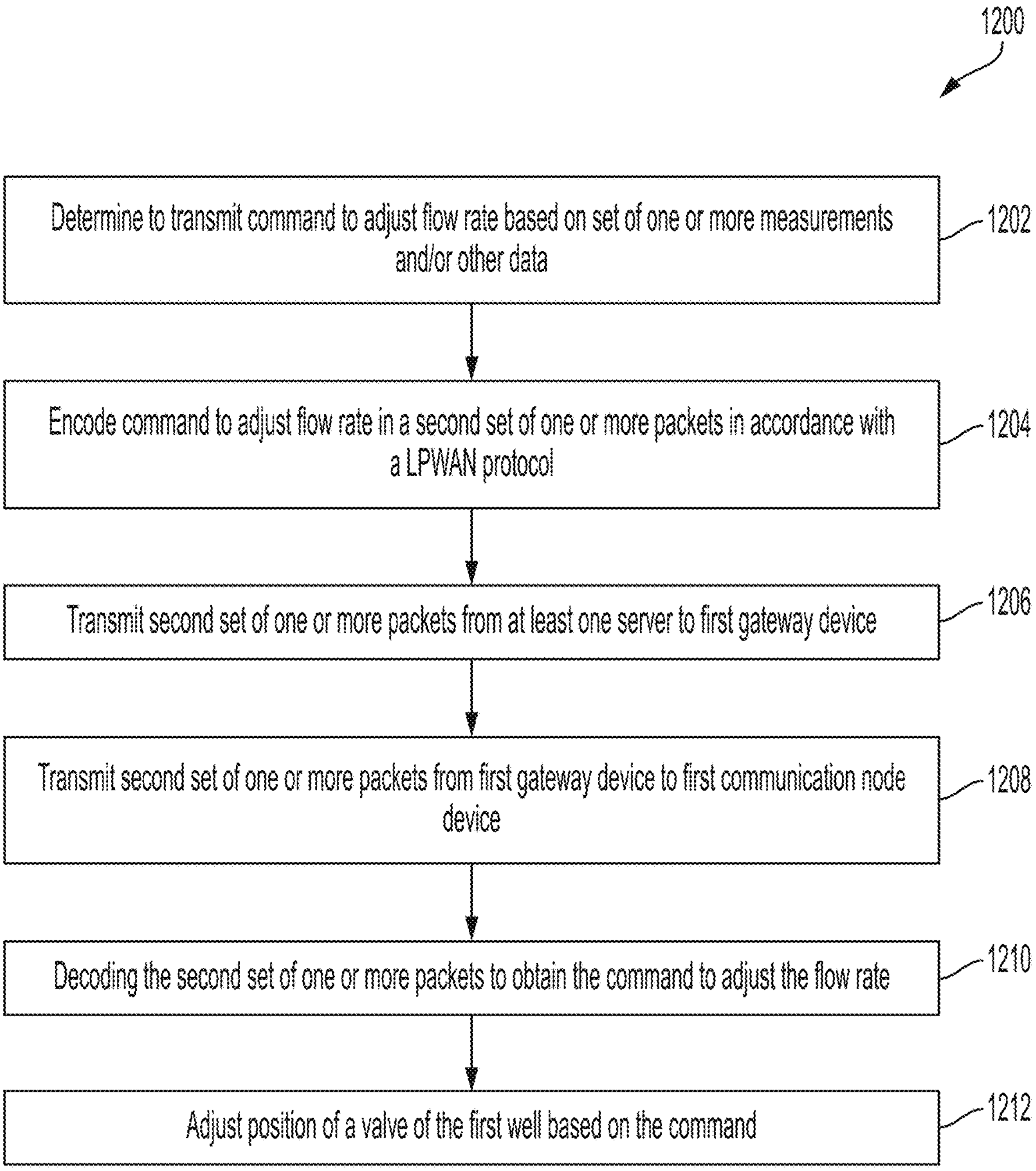
FIG. 12B is another flowchart of an illustrative process for monitoring extraction of landfill gas from a landfill using a communication system configured to transmit information using an LPWAN protocol, in accordance with some embodiments of the technology described herein.

In some embodiments, the action may comprise transmitting a command to the first communication node device that is to be provided by the first communication node device to the first control system, the command instructing the first control system to adjust a flow rate of landfill gas being extracted from the first well. For example, FIG. 12B is another flowchart of an illustrative process 1200 for monitoring extraction of landfill gas from a landfill using a communication system configured to transmit information using an LPWAN protocol, in accordance with some embodiments of the technology described herein.

The process 1200 may begin at act 1202 where it is determined to transmit a command to adjust flow rate based on the set of one or more measurements and/or other data. For example, act 1202 may be performed subsequent to act 1112 of process 1110 when it is determined to perform an action based on the set of one or more measurements. As described herein, the determination may be based on a determination that the set of one or more measurements are greater than an upper threshold, less than a lower threshold, outside of a range, and/or not equal to a target.

At act 1204, the command may be encoded in a second set of one or more packets in accordance with the particular LPWAN protocol, as described herein. For example, the at least one server may include hardware and/or software configured to encode a command into a set of one or more packets. At act 1206, the second set of one or more packets are transmitted from the at least one server to the first gateway device. At act 1208, the second set of one or more packets are transmitted from the first gateway device to the first communication node device.

At act 1210, the communication node device decodes the second set of one or more packets to obtain the command to adjust flow rate. For example, the communication node device may include hardware and/or software configured to decode the second set of one or more packets.

At act 1212, a position of a valve of a first well is adjusted based on the command. For example, subsequent to act 1210, the first communication node device may provide the command to the first control system. The first control system may adjust a position of a valve of the first well based on the command in order to adjust the flow rate of landfill gas being extracted from the first well. For example, the command may comprise an instruction to increase or decrease the flow rate. The control system may be configured to adjust a position of a valve based on the instruction. In some embodiments, the command may comprise an instruction to open or close the valve. In some embodiments, the command may comprise an incremental adjustment to apply to the valve. In some embodiments, the command may comprise a new position to which the valve should be moved.

It should be appreciated that the processes 1100 and/or 1200 may be embodied in a system. For example, the system may be a communication system configured to transmit information using a low-power wide area networking (LPWAN) protocol and may comprise a plurality of communication node devices including a first communication node device, one or more gateway devices including a first gateway device, and at least one server. The first communication node device may be configured to obtain from a first control system configured to monitor and/or control extraction of landfill gas at a first well of a plurality of wells in a landfill, a set of one or more measurements of one or more landfill gas characteristics of landfill gas being extracted from the first well, encode the set of one or more measurements of the one or more landfill gas characteristics in a first set of one or more packets in accordance with the particular LPWAN protocol, and transmit the first set of one or more packets from the first communication node device to the first gateway device using the particular LPWAN protocol. The first gateway device may be configured to transmit the first set of one or more packets from the first gateway device to the at least one server. The at least one server may be configured to decode, using the at least one server, the first set of one or more packets to obtain the set of one or more measurements of the one or more landfill gas characteristics, and determine, using the at least one server and the set of one or more measurements of the one or more landfill gas characteristics, whether to perform an action.

Figure 13:
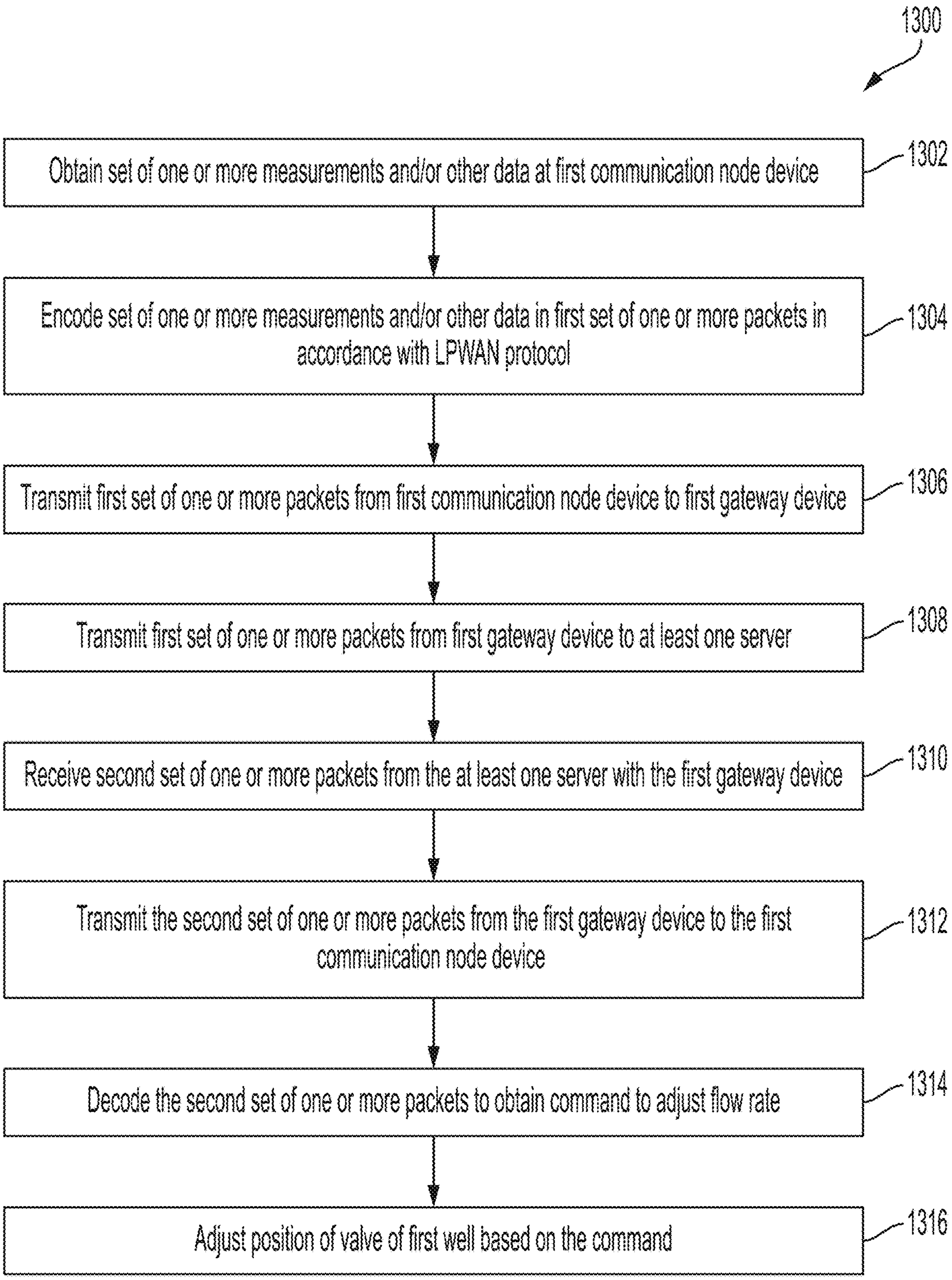
FIG. 13 is a flow chart of another illustrative process for monitoring extraction of landfill gas from a landfill using a communication system configured to transmit information using an LPWAN protocol, in accordance with some embodiments of the technology described herein.

FIG. 13 is a flow chart of another illustrative process 1300 for monitoring extraction of landfill gas from a landfill using a communication system configured to transmit information using an LPWAN protocol, in accordance with some embodiments of the technology described herein. For example, the communication system 200 described herein may be configured to perform the process 1300.

The process 1300 may begin at act 1302 where a set of one or more measurements and/or other data are obtained at a first communication node device. Act 1302 may be performed in the same or similar manner as act 1102 of process 1100. For example, the set of one or more measurements may be a set of one or more measurements of a landfill gas characteristic (e.g., gas concentration, gas temperature), a pressure (internal or external to the control system), and/or a characteristic of ambient air external to the control system.

At act 1304, the first communication node device encodes the set of one or more measurements and/or other data in a first set of one or more packets according to an LPWAN protocol. Act 1304 may be performed in the same or similar manner as act 1104 of process 1100.

At act 1306, the first communication node device transmits the set of one or more packets from the first communication node device to the first gateway device. Act 1306 may be performed in the same or similar manner as act 1106 of process 1100.

At act 1308, the first set of one or more packets are transmitted from the first gateway device to at least one server. Act 1308 may be performed in the same or similar manner as act 1108 of process 1100.

At act 1310, the first gateway device receives a second set of one or more packets from the at least one server. The second set of one or more packets may comprise a command to adjust a flow rate of landfill gas being extracted from a first well. The command may be transmitted to the first gateway device by the at least one server based on a determination made by the at least one server using the set of one or more measurements and/or other data (e.g., using acts 1110-1112 of process 1100).

At act 1312, the first gateway device transmits the second set of one or more packets to the first communication node device according to the particular LPWAN protocol. Act 1312 may be performed in the same or similar manner as act 1208 of process 1200.

At act 1314, the first communication node device decodes the second set of one or more packets to obtain the command to adjust flow rate. Act 1314 may be performed in the same or similar manner as act 1210 of process 1200.

At act 1316, the first control system adjusts a position of a valve of a first well based on the command. For example, the first communication device may provide the decoded command obtained at act 1316 to the first control system which acts on the command. Act 1316 may be performed in the same or similar manner as act 1212 of process 1200.

As described herein, the inventors have recognized that communications using an LPWAN protocol (e.g., LoRaWAN) may be advantageous where communication via another protocol (e.g., cellular, satellite, WiFi, WiMAX, Ethernet) is unavailable or undesired. In some instances, multiple communication protocols may be available, and the communication systems described herein may need to determine which protocol to use to transmit messages.

As described herein, the communication node device may be configured to obtain information from a control system in processes 1100-1300. In some embodiments, the information comprises a set of one or more measurements of one or more landfill gas characteristics of landfill gas being extracted from a first well. In some embodiments, the information comprises other data, as described herein. In some embodiments, the information comprises both the set of one or more measurements and the other data described herein.

Certain communication protocols may be beneficial to use in certain situations. As described herein, a drawback to communication via an LPWAN protocol is the relatively small maximum packet size imposed on communications. Communication via a protocol such as cellular may be desirable for its ability to transmit large messages without breaking up the message into smaller packets. On the other hand, LPWAN protocols may be cheaper to implement and more widely available (e.g., available where cellular coverage is poor, infrequent, or non-existent). The inventors have therefore developed a hybrid communication system which allows for selecting a communication protocol to transmit messages between a communication node device and at least one server.

In some embodiments, the hybrid communication system may be configured to transmit messages over a cellular connection whenever a cellular connection is available. If the cellular connection is unavailable, the message is instead transmitted over an LPWAN such as LoRaWAN. The cellular connection may be considered available when the cellular coverage is strong enough to transmit signals with a minimum threshold signal strength. Although cellular and LoRaWAN are used as examples for the description herein, it should be appreciated that the hybrid communication system may be implemented with any two or more communication protocols (e.g., an LPWAN protocol such as LoRaWAN, cellular, WiFi, WiMAX, Ethernet, satellite such as Starlink, or other suitable communication protocol).

The hybrid communication system described herein comprises an interface having components for transmitting and receiving messages according to the multiple protocols that the system selects from for communication. For example, the interface comprises hardware and/or software for performing encoding messages into a set of packets and decoding a set of packets, as is needed to communicate over an LPWAN.

As described herein, the communication systems developed by the inventors provide for techniques of prioritizing uplink (e.g., from communication node to gateway device and/or to server, from gateway device to server) and downlink (e.g., from server to gateway device and/or communication node, from gateway device to communication node) transfer of certain data. Indeed, the inventors have recognized that with finite bandwidth and limits on the quantity of messages that can be transmitted, asymmetric limits for uplink and downlink messages, and/or arbitrary limits imposed by a third-party, it can be advantageous to be selective about what data is transmitted and/or when it is transmitted.

Accordingly, in some embodiments, data transmitted by the systems described herein may be separated into different classes for both uplink and downlink data. The different classes of data may be associated with different priority levels. For example, a first class of data may be assigned a highest priority level relative to other classes. A second class of data may be assigned a second highest priority level relative to other classes, and so forth. The priority level of each class may be used to control whether transmission of one class of data should be prioritized (e.g., take precedence) over transmission of another class of data.

Any suitable number of classes of data may be used for prioritization (e.g., two, three, four, five, six, seven, eight, nine, ten, etc.). In one example embodiment, the data may be separated into five classes A-E as follows.

A first class ("class A") includes urgent messages that when generated, must be acted upon within a limited time period. For example, in some embodiments, such messages require a response in one minute or less, ten minutes or less, fifteen minutes or less, thirty minutes or less, one hour or less, twelve hours or less, one day or less, or another suitable limited time period. Such messages include, in the context of a landfill gas extraction system, an instruction to adjust a valve (e.g., close a valve) and/or an alert (e.g., an alert about a sudden loss of pressure.

A second class ("class B") includes typical measurement data. In some embodiments, normal measurement data includes gas concentration measurements obtained by a control system 112. Such typical (e.g., normal) measurement data includes data that is scheduled to be delivered in a semi-timely fashion (e.g., on a predefined schedule). In some embodiments, the predefined schedule is once per hour, once per day, once per week, or once per month, or another suitable predefined schedule. In some embodiments, such typical measurement data is not disposable. For example, such typical measurement data include measurement data that is used to meet compliance requirements for the landfill.

A third class ("class C") includes re-transmissions of data. In some embodiments, the re-transmitted data is class A and/or class B data. Such data is be re-transmitted and retained until delivery of the data is confirmed. Lingering data can overwhelm a device (e.g., communication node 400, gateway device 300) with limited memory available. It may therefore be necessary to transmit this data in a timely fashion so that memory of the device can be freed up.

A fourth class ("class D") includes lower-priority, disposable supplementary or diagnostic information. For example, in some embodiments, such data includes environmental data, such as ambient temperature. In some embodiments, the fourth class includes operating parameters to be applied to the control systems, described herein. Such measurements may need to be refreshed occasionally, but change infrequently. In some embodiments, a portion of the data in class D is transmitted when possible (e.g., the oldest data present in the fourth class), and subsequent portions of the data are transmitted at the next possibility of transmitting data from class D (e.g., the next oldest data present in the fourth class).

A fifth class ("class E") includes fragments of pending firmware upgrades. In some embodiments, the fifth class or other subsequent classes include all other data that is to be transmitted but which does not fall within any of the above classes. The data in any or all of the above classes may be transmitted using the encoding techniques described herein (e.g., with reference to FIG. 12A). In some embodiments, the classes described herein may be combined (e.g., class A and B may be combined into a single class of data) or separated (e.g., class A may be separated into one class of data including commands and a second class of data including alerts), and the aspects of the technology are not limited to the illustrative embodiments described herein.

Division of data into at least two classes may be used in a number of different control techniques. In some embodiments, the class to which data belongs may be used to determine when to transmit the data. For example, where the system has a limitation on number of messages transmitted per day (e.g., a limit of twelve messages per day), transmissions may only be made when data from a high priority class can be included in the transmission. For example, the system may be configured to transmit data only when data from a high priority class (e.g., class A, class A and/or B) can be included in the transmission. Such techniques ensure that the limited transmissions are not utilized to transmit only low priority data.

In some embodiments, the class to which data belongs may be used to determine what data to include in a transmission. For example, there may be limits on the amount of data that can be included in a transmission. The system may be configured to include data from a higher priority class before including data from a lower priority class. In some embodiments, all available data from a higher priority class may be included in a transmission before any data from a lower class is included in a transmission (e.g., data from class B cannot be included in a transmission unless all data from class A is included). In some embodiments, a certain amount of data in a transmission may be allotted to each class, with the amount of data allotted to higher priority classes being higher than lower priority classes. If the amount of data available to send in a higher priority class does not meet or exceed the allotted amount of data, then the excess space may be allotted to the next highest priority class of data.

In some embodiments, the class to which data belongs may be used to manage limited bandwidth of the system in a systematic way. For example, if a landfill site has too many control devices and/or too few gateways, lower-class data (e.g., class D or E) may be delivered infrequently or never (e.g., as the amount of data generated for higher priority classes, such as classes A and B, is high). In some embodiments this issue can be addressed by limiting processes that generate higher priority (e.g., class A or B) data to reduce the total amount of higher priority data generated. This may be accomplished, for example, by easing (e.g., increasing or decreasing) thresholds for generating alerts (thereby reducing or increasing the amount of alerts generated). In further embodiments, measurements (e.g., typical measurement data such as gas concentration measurements) may be collected less frequently.

Figure 14:
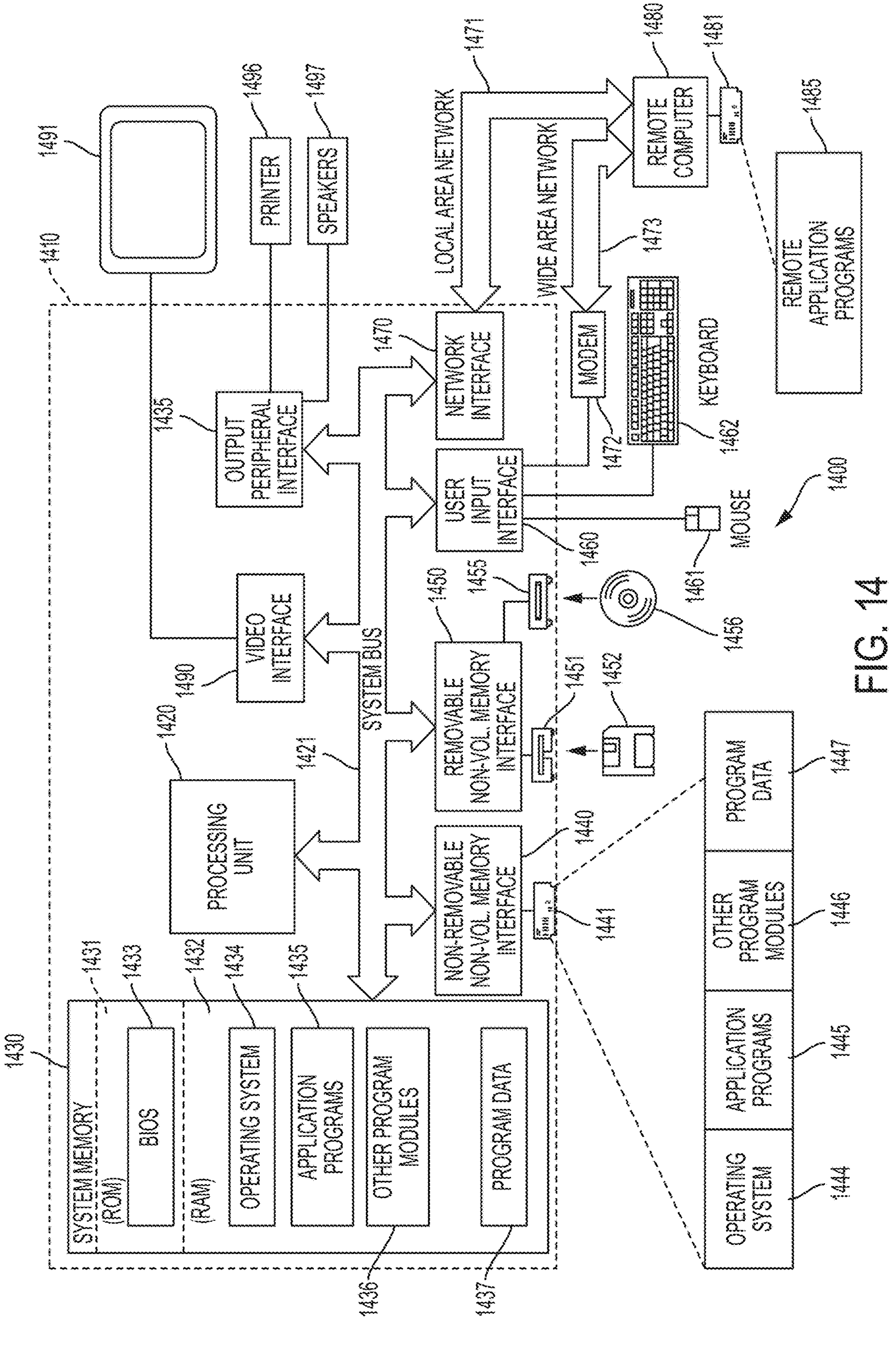
FIG. 14 is a block diagram of an exemplary computer system in which aspects of the present disclosure may be implemented, in accordance with some embodiments of the technology described herein.

FIG. 14 illustrates an example of a suitable computing system environment 1400 on which techniques disclosed herein may be implemented. In some embodiments, portions of a landfill gas extraction control system may be implemented in a computing system environment. In some embodiments, aspects of one or more techniques describes herein may be implemented in a computing system environment.

The computing system environment 1400 is only one example of a suitable computing environment and is not intended to suggest any limitation as to the scope of use or functionality of the devices and techniques disclosed herein. Neither should the computing environment 1400 be interpreted as having any dependency or requirement relating to any one or combination of components illustrated in the exemplary operating environment 1400.

The techniques disclosed herein are operational with numerous other general purpose or special purpose computing system environments or configurations. Examples of well-known computing systems, environments, and/or configurations that may be suitable for use with techniques disclosed herein include, but are not limited to, personal computers, server computers, hand-held devices (e.g., smart phones, tablet computers, or mobile phones), laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 14, an exemplary system for implementing techniques described herein includes a general purpose computing device in the form of a computer 1410. Components of computer 1410 may include, but are not limited to, a processing unit 1420, a system memory 1430, and a system bus 1421 that couples various system components including the system memory to the processing unit 1420. The system bus 1421 may be any of several types of bus structures including a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1410 typically includes a variety of computer readable media. Computer readable media can be any available media that can be accessed by computer 1410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 1410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1430 includes computer storage media in the form of volatile and/or nonvolatile memory such as read only memory (ROM) 1431 and random access memory (RAM) 1432. A basic input/output system 1433 (BIOS), containing the basic routines that help to transfer information between elements within computer 1410, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, application programs 1435, other program modules 1436, and program data 1437.

The computer 1410 may also include other removable/non-removable, volatile/nonvolatile computer storage media. By way of example only, FIG. 14 illustrates a hard disk drive 1441 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1441 is typically connected to the system bus 1421 through a non-removable memory interface such as interface 1440, and magnetic disk drive 1451 and optical disk drive 1455 are typically connected to the system bus 1421 by a removable memory interface, such as interface 1450.

The drives and their associated computer storage media discussed above and illustrated in FIG. 14, provide storage of computer readable instructions, data structures, program modules and other data for the computer 1410. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437. Operating system 1444, application programs 1445, other program modules 1446, and program data 1447 are given different numbers here to illustrate that, at a minimum, they are different copies. A user may enter commands and information into the computer 1410 through input devices such as a keyboard 1462 and pointing device 1461, commonly referred to as a mouse, trackball, or touch pad. Other input devices (not shown) may include a microphone, joystick, game pad, satellite dish, scanner, or the like. These and other input devices are often connected to the processing unit 1420 through a user input interface 1460 that is coupled to the system bus but may be connected by other interface and bus structures, such as a parallel port, game port or a universal serial bus (USB). A monitor 1491 or other type of display device is also connected to the system bus 1421 via an interface, such as a video interface 1490. In addition to the monitor, computers may also include other peripheral output devices such as speakers 1497 and printer 1496, which may be connected through an output peripheral interface 1495.

The computer 1410 may operate in a networked environment using logical connections to one or more remote computers, such as a remote computer 1480. The remote computer 1480 may be a personal computer, at least one server, a router, a network PC, a peer device, or other common network node, and typically includes many or all of the elements described above relative to the computer 1410, although only a memory storage device 1481 has been illustrated in FIG. 14. The logical connections depicted in FIG. 14 include a local area network (LAN) 1471 and a wide area network (WAN) 1473 but may also include other networks. Such networking environments are commonplace in offices, enterprise-wide computer networks, intranets and the Internet.

When used in a LAN networking environment, the computer 1410 is connected to the LAN 1471 through a network interface or adapter 1470. When used in a WAN networking environment, the computer 1410 typically includes a modem 1472 or other means for establishing communications over the WAN 1473, such as the Internet. The modem 1472, which may be internal or external, may be connected to the system bus 1421 via the user input interface 1460, or other appropriate mechanism. In a networked environment, program modules depicted relative to the computer 1410, or portions thereof, may be stored in the remote memory storage device. By way of example, and not limitation, FIG. 14 illustrates remote application programs 1485 as residing on memory device 1481. It will be appreciated that the network connections shown are exemplary and other means of establishing a communications link between the computers may be used.

Embodiments of the above-described techniques can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively, or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various events/acts are described herein as occurring or being performed at a specified time. One of ordinary skill in the art would understand that such events/acts may occur or be performed at approximately the specified time.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

What is claimed is:

1. A method for monitoring extraction of landfill gas from a landfill having a plurality of wells by using a communication system configured to transmit information using a low-power wide area networking (LPWAN) protocol, the communication system comprising one or more gateway devices including a first gateway device and a plurality of communication node devices including a first communication node device, the method comprising:

obtaining, at the first communication node device and from a first control system configured to monitor and/or control extraction of landfill gas at a first well of the plurality of wells, information comprising a set of one or more measurements of one or more landfill gas characteristics of landfill gas being extracted from the first well and/or other data;

encoding the set of one or more measurements of the one or more landfill gas characteristics and/or other data in a first set of one or more packets in accordance with the LPWAN protocol;

prior to transmitting the first set of one or more packets, determining whether to transmit the first set of one or more packets based at least in part on a priority level of the set of one or more measurements relative to one or more other encoded landfill gas characteristics and/or other data;

transmitting the first set of one or more packets from the first communication node device to the first gateway device using the LPWAN protocol;

transmitting the first set of one or more packets from the first gateway device to at least one server;

decoding, using the at least one server, the first set of one or more packets to obtain the set of one or more measurements of the one or more landfill gas characteristics and/or other data; and determining, using the at least one server and the set of one or more measurements of the one or more landfill gas characteristics and/or other data, whether to perform an action.

2. The method of claim 1, wherein the determining whether to perform an action comprises comparing the set of one or more measurements of the one or more landfill gas characteristics to at least one threshold.

3. The method of claim 1, wherein the action comprises transmitting an alert indicating that at least one of the landfill gas characteristics is outside of a target range, below a first threshold value, and/or above a second threshold value.

4. The method of claim 1, wherein the action comprises transmitting a command to the first communication node device that is to be provided by the first communication node device to the first control system, the command instructing the first control system to adjust a flow rate of landfill gas being extracted from the first well.

5. The method of claim 4, wherein transmitting the command comprises:

encoding the command in a second set of one or more packets in accordance with the LPWAN protocol;

transmitting the second set of one or more packets from the at least one server to the first gateway device;

transmitting the second set of one or more packets from the first gateway device to the first communication node device;

decoding, using the first communication node device, the second set of one or more packets to obtain the command instructing the first control system to adjust the flow rate of landfill gas being extracted from the first well; and providing the command to the first control system.

6. The method of claim 4, further comprising:

using the first control system to adjust, based on the command, a position of a valve of the first well.

7. The method of claim 1, wherein the action comprises outputting an indication that the landfill gas extracted from the first well is in compliance with one or more local, state, and/or federal requirements.

8. The method of claim 1, wherein the one or more measurements of the one or more landfill gas characteristics comprises one or more measurements of a concentration of at least one constituent gas in the landfill gas extracted from the first well.

9. The method of claim 8, wherein the at least one constituent gas comprises methane.

10. The method of claim 1, wherein a size of each packet of the first set of one or more packets is greater than or equal to 1 byte and less than or equal to 242 bytes.

11. The method of claim 1, wherein the LPWAN protocol is a long range wide area network (LoRaWAN) protocol.

12. The method of claim 1, further comprising reducing a frequency at which the obtaining is performed based on a transmission bandwidth of the first communication node device.

13. The method of claim 1, further comprising prior to transmitting the first set of one or more packets, determining whether data that is a higher priority level than the first set of one or more packets is available to transmit and transmitting the data that is a higher priority level prior to transmitting the first set of one or more packets.

14. The method of claim 1, wherein transmitting the first set of one or more packets from the first gateway device to at least one server is performed using one or more of a cellular, WiFi, WiMAX, Ethernet, and/or satellite connection.

15. A communication system configured to transmit information using a low-power wide area networking (LPWAN) protocol, the communication system comprising:

a plurality of communication node devices including a first communication node device;

one or more gateway devices including a first gateway device; and at least one server, wherein:

the first communication node device is configured to:

obtain from a first control system configured to monitor and/or control extraction of landfill gas at a first well of a plurality of wells in a landfill, information comprising a set of one or more measurements of one or more landfill gas characteristics of landfill gas being extracted from the first well and/or other data;

encode the set of one or more measurements of the one or more landfill gas characteristics and/or other data in a first set of one or more packets in accordance with the LPWAN protocol;

determine, prior to transmitting the first set of one or more packets, whether the data encoded in the first set of one or more measurements is a higher priority level than the other packets available to transmit;

transmit the first set of one or more packets from the first communication node device to the first gateway device using the LPWAN protocol; and the first gateway device is configured to:

transmit the first set of one or more packets from the first gateway device to the at least one server; and the at least one server is configured to:

decode, using the at least one server, the first set of one or more packets to obtain the set of one or more measurements of the one or more landfill gas characteristics and/or other data;

determine, using the at least one server and the set of one or more measurements of the one or more landfill gas characteristics and/or other data, whether to perform an action.

16. A method for monitoring extraction of landfill gas from a landfill having a plurality of wells by using a communication system configured to transmit information using a low-power wide area networking (LPWAN) protocol, the communication system comprising one or more gateway devices including a first gateway device and a plurality of communication node devices including a first communication node device, the method comprising:

obtaining, at the first communication node device and from a first control system configured to monitor and/or control extraction of landfill gas at a first well of the plurality of wells, information comprising a set of one or more measurements of one or more landfill gas characteristics of landfill gas being extracted from the first well and/or other data;

encoding the set of one or more measurements of the one or more landfill gas characteristics and/or other data in a first set of one or more packets in accordance with the LPWAN protocol;

determining, prior to transmitting the first set of one or more packets, whether to transmit the first set of one or more packets based at least in part on a priority level of the first set of one or more measurements relative to other data;

transmitting the first set of one or more packets from the first communication node device to the first gateway device using the LPWAN protocol;

transmitting the first set of one or more packets from the first gateway device to at least one server;

receiving, with the first gateway device, a second set of one or more packets from the at least one server, the second set of packets being encoded from a command from the at least one server to adjust, with the first control system, a flow rate of landfill gas being extracted from the first well;

transmitting the second set of one or more packets from the first gateway device to the first communication node;

decoding, using the first communication node, the second set of one or more packets to obtain the command to adjust the flow rate of landfill gas being extracted from the first well; and adjusting a position of a valve of the first well based on the command.

17. The method of claim 16, wherein the one or more measurements of the one or more landfill gas characteristics comprises one or more measurements of a concentration of at least one constituent gas in the landfill gas extracted from the first well.

18. The method of claim 16, wherein a size of each packet of the first set of one or more packets is greater than or equal to 1 byte and less than or equal to 242 bytes.

19. The method of claim 16, wherein the LPWAN protocol is a long range wide area network (LoRaWAN) protocol.

* * * * *